(12) United States Patent
Alanqari et al.

(10) Patent No.: US 11,898,087 B2
(45) Date of Patent: Feb. 13, 2024

(54) POLYMER DISPERSANT FOR WELL CEMENTING

(71) Applicant: Saudi Arabian Oil Company, Dhahran (SA)

(72) Inventors: Khawlah A. Alanqari, Al-Khubar (SA); Vikrant Wagle, Abqaiq (SA); Abdullah Al-Yami, Dhahran (SA); Ali Al-Safran, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 48 days.

(21) Appl. No.: 17/529,382

(22) Filed: Nov. 18, 2021

(65) Prior Publication Data

US 2023/0151260 A1 May 18, 2023

(51) Int. Cl.
*C09K 8/467* (2006.01)

(52) U.S. Cl.
CPC .................................. *C09K 8/467* (2013.01)

(58) Field of Classification Search
CPC .......... C04B 24/20; C04B 24/22; C09K 8/467
See application file for complete search history.

(56) References Cited

U.S. PATENT DOCUMENTS

| | | | |
|---|---|---|---|
| 3,359,225 A | 12/1967 | Weisend | |
| 3,997,353 A * | 12/1976 | Chervenka, Jr. | ...... C04B 28/065 |
| | | | 106/695 |
| 4,360,452 A | 11/1982 | Zabrocki et al. | |
| 4,443,496 A | 4/1984 | Obitsu et al. | |
| 5,109,030 A * | 4/1992 | Chao | ................... C04B 24/2641 |
| | | | 521/149 |
| 5,192,366 A | 3/1993 | Nishioka et al. | |
| 5,350,450 A | 9/1994 | Tamabe et al. | |
| 5,358,566 A | 10/1994 | Tanaka et al. | |
| 6,774,146 B2 | 8/2004 | Savoly et al. | |
| 8,053,498 B2 | 11/2011 | Wieland et al. | |
| 9,034,802 B2 * | 5/2015 | Ahrenst | ................... F17D 1/17 |
| | | | 507/221 |

OTHER PUBLICATIONS

Daxad® 17 Safety Data Sheet, 1748G Sulfonated Naphthalene Condensate, Sodium Salt, Geo Specialty Chemicals, Revision No. 1.01. (Year: 2014).*
Daxad® 19 Safety Data Sheet, 1748P Sulfonated Naphthalene Condensate, Sodium Salt, Geo Specialty Chemicals, Revision No. 2.02. (Year: 2016).*

* cited by examiner

*Primary Examiner* — Anthony J Green
(74) *Attorney, Agent, or Firm* — DINSMORE & SHOHL LLP

(57) ABSTRACT

The present disclosure concerns a cement dispersant for cement compositions wherein the cement dispersant is a polynaphthalene sulfonate salt having a weight average molecular weight of from 2500 g/mol to 3000 g/mol. The cement compositions are of from 10 weight percent to 70 weight percent of a cement precursor based on the total weight of the cement composition, from 5 weight percent to 70 weight percent water based on the total weight of the cement composition, and from 0.001 percent by weight of cement (BWOC) to 1.0 percent BWOC the cement dispersant. The cement dispersant provides improved rheological properties, allowing for good cement dispensing and increased presence of weighting agents.

19 Claims, 5 Drawing Sheets

POLYMER DISPERSANT FOR WELL CEMENTING

TECHNICAL FIELD

The present disclosure generally relates to cement compositions for wellbore cementing and more specifically to polymer dispersants therein.

BACKGROUND

Extracting hydrocarbons from subterranean hydrocarbon sources may require drilling a hole from the surface to the subterranean geological formation containing the hydrocarbons. Specialized drilling techniques and materials are utilized to form the wellbore hole and extract the hydrocarbons. Specialized materials utilized in drilling operations include materials for sealing the casing-casing annulus between two tubular strings installed in the wellbore. Such specialized materials may also be formulated for specific downhole conditions. These specialized materials may also be used in wellbore remediation and for treating subterranean formations, such as treating lost circulation zones or water zone remediation.

A wellbore is a hole that extends from the surface to a location beneath the surface to permit access to hydrocarbon-bearing subterranean formations. The wellbore contains at least a portion of a fluid conduit that links the interior of the wellbore to the surface. The fluid conduit coupling the interior of the wellbore to the surface may be capable of permitting regulated fluid flow from the interior of the wellbore to the surface. The fluid conduit may also permit access between equipment on the surface and the interior of the wellbore. The fluid conduit may be defined by one or more tubular strings, such as wellbore casings for example, inserted into the wellbore and secured in the wellbore.

SUMMARY

The tubular strings forming the fluid conduit may have at least two openings (typically on opposing ends) with an enclosing wall having an interior surface and an exterior surface. The interior surface defines the fluid conduit. Examples of tubular strings and portions of tubular strings used in the wellbore as fluid conduits or for making or extending fluid conduits include casings, production liners, coiled tubing, pipe segments, tubes, pipe strings, mechanical structures with interior voids, or combinations of these. A tubular string may include an assembly of several shorter tubular strings connected to one another, such as joined pipe segments or casings.

When positioned in the wellbore, the exterior surfaces of the tubular string and the internal wall of the wellbore define a wellbore annulus. The wellbore annulus has a volume in between the external surface of the tubular string and the wellbore wall. Additional casing-casing annuli may be formed by installing progressively smaller tubular strings within the larger tubular string initially secured in the wellbore. Installing each tubular string includes positioning the tubular string in the wellbore and placing a sealing material, such as a cement, in the wellbore annulus or the casing-casing annulus to seal the annulus.

Primary sealing refers to the process of initially sealing the annulus upon installation of the tubular string in the wellbore. Primary sealing may refer to initial sealing of the annulus between the exterior surface of the tubular string and the wellbore wall of the wellbore or initial sealing of a casing-casing annulus. Primary sealing in wellbore installations may be performed with wellbore cement and, thus, may be commonly referred to as "primary cementing." Primary sealing or cementing forms a protective solid sheath around the exterior surface of the tubular string. Wellbore cements may be also be used to treat lost circulation zones of wellbores or for treating subterranean formations, such as conducting water shut off techniques.

The wellbore cements commonly used for cementing tubular strings in wellbores or remediating lost circulation zones often include a mixture of metal oxides. In particular, cements for wellbore cementing application may include silicates, such as tricalcium silicate ($Ca_3SiO_5$) and dicalcium silicate ($Ca_2SiO_4$), as well as tricalcium aluminate ($3CaO \cdot Al_2O_3$) and tetracalcium alumina ferrite ($C_4AF$). In addition, gypsum may be added to control the setting time of cement. The cement may be combined with water to produce a slurry, which is then pumped downhole for primary cementing or for treatment of a subterranean formation. During curing of the cement, constituents of the wellbore cements undergo hydration through contact with the water and other reactions that cure the cement into a rigid solid. In particular, upon contact with water, the gypsum in the cement partially dissolves releasing calcium and sulphate ions to react with the aluminate and hydroxyl ions produced by the tricalcium aluminate (C3A) to form a calcium trisulphoaluminate hydrate, which may be known as the mineral Ettringite ($Ca_6Al_2(SO_4)_3(OH)_{12} \cdot 26H_2O$ (abbreviated C3A·3CS·32H)). The trisulpho-aluminate hydrate precipitates onto the surfaces of the tricalcium aluminate (C3A), which may prevent further rapid hydration (flash-set) of the tricalcium aluminate. The gypsum is gradually consumed and Ettringite continues to precipitate until the gypsum is consumed. The sulphate ion concentration decreases and the ettringite will become unstable converting to calcium monosulphoaluminate hydrate. The remaining unhydrated tricalcium aluminate will form calcium aluminate hydrate.

Cement slurry design is based on the altering or inhibition of the hydration reactions with specific additives. Cement must be designed in a way to ensure acceptable properties such as mix ability, stability, rheology, fluid loss, and adequate thickening time. Cement dispersants concern additives that are provided to well cement slurries to reduce high initial slurry viscosities or friction losses, particularly when the cement slurry is to be pumped. The presence of a cement dispersant can improve or modify the rheological properties of the slurry, thereby improving the quality of the slurry for the purposes of mixing and placement. The cement dispersant, by lowering the frictional properties of the slurry, can reduce the pumping rate required to obtain turbulent flow, reduce the surface pumping pressure, and reduce the horsepower needed to pump the slurry into the wellbore. Further, the presence of a cement dispersant can provide an increased solids-to-water ratio for the slurry with good rheological properties compared to cement compositions without dispersants. The dispersant may allow for high-density slurries, such as slurries having densities of from 120 pounds per cubic foot (pcf) to 180 pcf, with a high weight per volume without needing a weighting additive. Without being bound by any particular theory, it is believed that dispersants are generally understood to reduce or prevent flocculation of cement particles by absorbing onto the hydration cement particles and thereby providing a negative charge, which results in repulsion forces that aids to lubricate the slurry.

Accordingly, ongoing needs exist for cement dispersants that improve the rheological properties of the cement compositions and that reduce viscosity of the cement slurry and friction losses as the cement slurry is mixed and pumped into place downhole. The cement compositions of the present disclosure include a cement dispersant that includes polymerized naphthalene sulfonates with an average molecular weight of from 2500 g/mol to 3000 g/mol. The cement compositions may also include a cement precursor, a cement retarder, a defoamer and water.

According to one or more aspects of the present disclosure, a cement composition comprises from 10 weight percent to 70 weight percent cement precursor based on the total weight of the cement composition; from 5 weight percent to 70 weight percent water based on the total weight of the cement composition; and from 0.001 percent by weight of cement (BWOC) to 1.0 percent BWOC cement dispersant, where the cement dispersant comprises a polynaphthalene sulfonate salt having an average molecular weight of from 2500 g/mol to 3000 g/mol.

In one or more other aspects of the present disclosure, comprising method for cementing a wellbore includes dispensing a cement composition into an annulus defined between a tubular string and an inner wall of a wellbore or between two tubular strings, where the cement composition comprises: from 10 weight percent to 70 weight percent cement precursor based on the total weight of the cement composition; from 5 weight percent to 70 weight percent water based on the total weight of the cement composition; and from 0.001 percent by weight of cement (BWOC) to 1.0 percent BWOC cement dispersant, where the cement dispersant comprises a polynaphthalene sulfonate salt having a weight average molecular weight of from 2500 g/mol to 3000 g/mol; and, allowing the cement composition to cure in the annulus to form a cured cement, where the cement dispersant increases the rheological properties.

Additional features and advantages of the described embodiments will be set forth in the detailed description which follows, and in part will be readily apparent to those skilled in the art from that description or recognized by practicing the described embodiments, including the detailed description which follows as well as the drawings and the claims.

BRIEF DESCRIPTION OF THE DRAWINGS

The following detailed description of specific aspects of the present disclosure can be best understood when read in conjunction with the following drawings, in which like structure is indicated with like reference numerals and in which.

Figure 1:
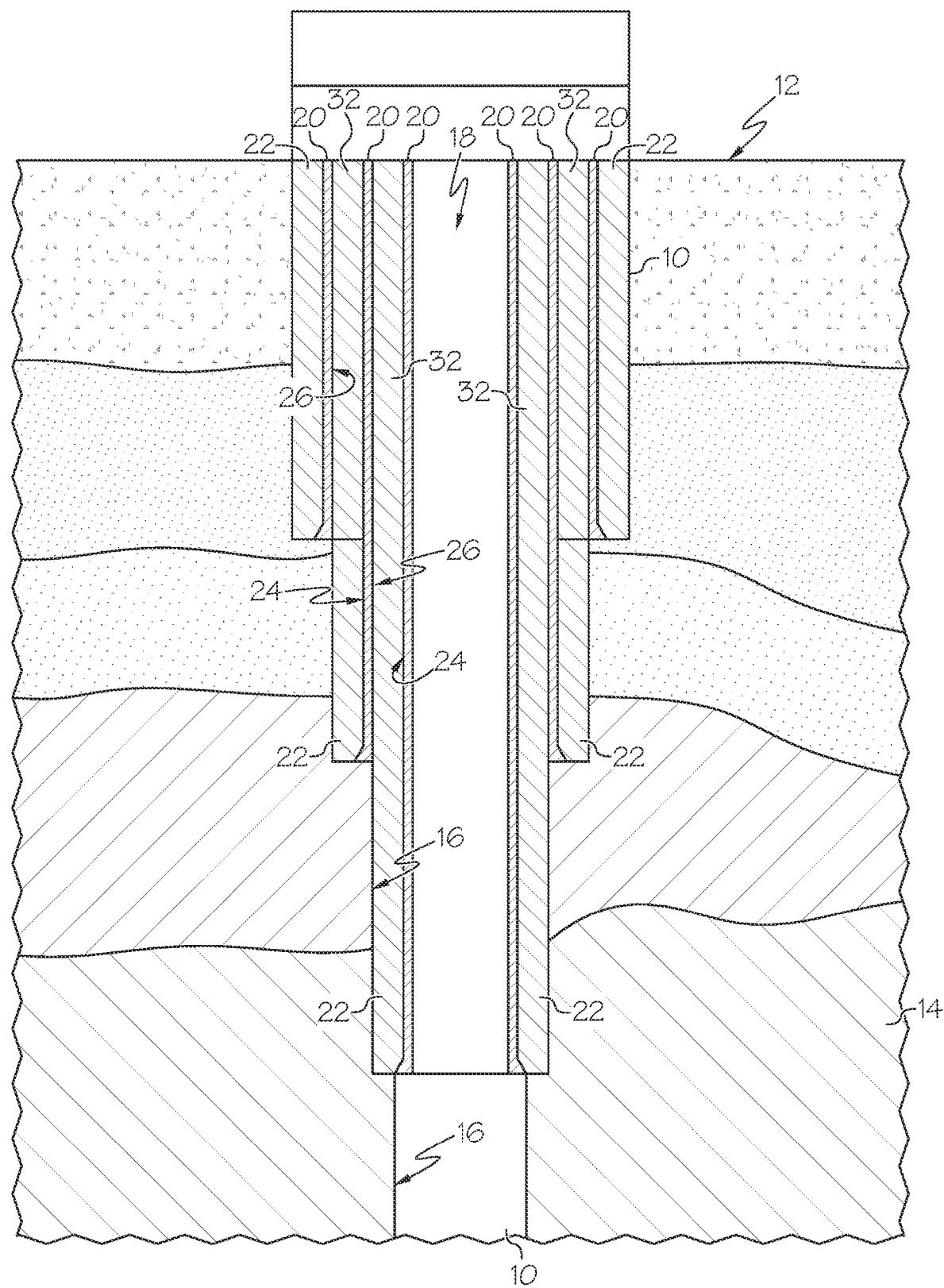
FIG. 1 schematically depicts a plurality of tubular strings installed in a wellbore, according to one or more embodiments shown and described in the present disclosure.

Reference will now be made in greater detail to various aspects of the present disclosure, some aspects of which are illustrated in the accompanying drawings.

DETAILED DESCRIPTION

The present disclosure is directed to cement compositions comprising a cement dispersant for improving the rheological properties of a cement slurry. The present disclosure is also directed to methods of cementing using the cement compositions. In aspects of the present disclosure, a cement composition includes from 10 weight percent (wt. %) to 70 weight wt. % precursor based on the total weight of the cement composition, from 5 wt. % to 70 wt. % water based on the total weight of the cement composition, and from 0.001 percent by weight of cement (BWOC) to 1 percent BWOC cement dispersant, where the cement dispersant comprises polymers of naphthalene sulfonate with a molecular weight of from 2500-2800 g/mol or an average molecular weight of 2500 grams per mole (g/mol) to 3000 g/mol or a molecular weight distribution of 2500 to 3000 g/mol. As set forth herein, a "molecular weight distribution" refers to the normal distribution or bell shaped distribution of polymers generated during a particular polymerization reaction, such as, for example, where 95% of the generated polymers fall within 2 standard deviations of the mean polymer generated. The cement compositions of the present disclosure may have a thickening time or curing time of greater than 4 hours at downhole temperatures of greater than or equal to 50° C., among other features.

As used throughout this disclosure, the term "hydrocarbon-bearing formation" may refer to a subterranean geologic region containing hydrocarbons, such as crude oil, hydrocarbon gases, or both, which may be extracted from the subterranean geologic region. The terms "subterranean formation" or just "formation" may refer to a subterranean geologic region that contains hydrocarbons or a subterranean geologic region proximate to a hydrocarbon-bearing formation, such as a subterranean geologic region to be treated for purposes of enhanced oil recovery or reduction of water production.

As used throughout this disclosure, the term "fluid" may include liquids, gases, or both.

As used throughout the present disclosure, the term "spacer fluid" may refer to a fluid utilized to maintain separation between any two other materials utilized in well production, such as fluids that may be incompatible with each other, for example.

As used throughout the present disclosure, the term "displacement fluid" may refer to a fluid injected into the wellbore to displace a different fluid out of the wellbore and into the annulus or into a portion of the subterranean formation.

As used throughout the present disclosure, the term "cement precursor" may refer to any suitable material which, when mixed with water, may be cured into a cement. A cement precursor may be hydraulic or non-hydraulic.

As used throughout this disclosure, the term "cure" or "curing" may refer to providing adequate moisture, temperature and time to allow a cement or concrete to achieve the desired properties (such as hardness) for its intended use through one or more reactions between the water and the cement precursors.

As used throughout this disclosure, the term "thickening" may refer to an increase in Bearden consistency, which may be caused by curing of the cement compositions of the present disclosure. A "thickening time" may refer to a time during curing at which the cement composition reaches a Bearden Consistency sufficient to cause the cement composition to become unpumpable.

As used throughout the present disclosure, the term "annulus" may refer to the volume defined between the exterior surface of a tubular string and the wellbore wall or an inner surface of another tubular string that surrounds to the tubular string. The term "annulus" may refer to the wellbore annulus, a casing-casing annulus, or both.

As used throughout the present disclosure, the term "by weight of cement" may refer to an amount of a constituent of the cement composition relative to the amount of the cement precursor in the cement composition and can be calculated by dividing the weight of the constituent by the total weight of the cement precursor in the cement composition and multiplying by 100%. "By weight of cement" may be abbreviated using the acronym BWOC.

As used throughout the present disclosure, the term "substantially free" of a constituent in the cement composition means that the cement composition includes less than 1% BWOC of that constituent, unless otherwise stated. When used outside the context of the cement composition, the term "substantially free" of a constituent refers to less than 1 weight percent (wt. %) of that component in a composition, unless otherwise stated.

Referring to FIG. 1, a wellbore 15 having a plurality of tubular strings 20 installed in the wellbore 10 is schematically depicted. The wellbore 10 forms a pathway capable of permitting both fluid and apparatus to traverse between the surface 12 and the hydrocarbon-bearing formation 14 or other subterranean formation. Besides defining the void volume of the wellbore 10, the wellbore wall 16 may also act as an interface through which fluid can transition between the hydrocarbon-bearing subterranean formations 14 through which the wellbore 10 traverses and the interior of the wellbore 10. The wellbore wall 16 can be unlined (that is, bare rock or formation) to permit such interaction with the formation or lined (that is, with one or more tubular strings 20 as previously described in this disclosure) so as to not permit such interactions.

The wellbore 10 may contain at least a portion of a fluid conduit 18 linking the interior of the wellbore 10 to the surface 12. The fluid conduit 18 connecting the interior of the wellbore 10 to the surface 12 may be capable of permitting regulated fluid flow from the interior of the wellbore 10 to the surface 12. The fluid conduit 18 may also permit access between equipment on the surface 12 and the interior of the wellbore 10. As previously described, the fluid conduit 18 may be defined by one or a plurality of tubular strings 20 installed in the wellbore 10, which may form a wellbore annulus 22 with the wellbore wall 16 of the wellbore 10. The wellbore annulus 22 is an annular volume defined between an external surface 24 of the tubular string 20 and the wellbore wall 16. As wellbore drilling continues and the wellbore 10 extends deeper into the hydrocarbon bearing subterranean formation 14, one or more additional tubular strings 20 may be installed within the fluid conduit 18 defined by the initial tubular string 20. Additional tubular strings 20 may have outer cross-sectional dimensions that are less than the inner cross-sectional dimensions of the tubular strings 20 within which the additional tubular strings are disposed. Each additional tubular string 20, when installed in the wellbore 10, may form a casing-casing annulus 32 defined between the exterior surface 24 of the additional tubular string 20 and the interior surface 26 of the tubular string 20 surrounding the additional tubular string 20. After drilling is complete and the wellbore 10 is fitted with production tubing for production, the wellbore 10 may include a plurality of tubular strings 20 of progressively smaller cross-sectional dimensions that define the wellbore annulus 22 and a plurality of casing-casing annuli 32 (annular region defined between two tubular strings).

Installing each tubular string 20 may include positioning the tubular string 20 in the wellbore 10 and primary cementing of the tubular string 20 in the wellbore 10. The primary cementing process may include placing a cement composition in the wellbore annulus 22, casing-casing annulus 32, or both, and curing the cement composition to seal the wellbore annulus 22, casing-casing annulus 32, or both. Primary cementing may anchor and support the tubular string 20 in the wellbore 10. Primary sealing may also provide a hydraulic seal in the annulus (wellbore annulus 22, casing-casing annulus 32, or both) that may prevent migration of gases and liquids from one side of the hydraulic seal to the other. This hydraulic seal may prevent fluid communication between production zones in the wellbore 10, referred to as zonal isolation, or may prevent migration of fluids to the surface 12.

Before primary sealing can be performed, the wellbore 10 may be drilled using a drill string (not shown) in the presence of a drilling fluid, which may be retained in the wellbore 10 at the conclusion of drilling, such as in the fluid conduit 18. With the drilling fluid left in the wellbore 10, the tubular string 20 may be positioned in the wellbore 10. When the tubular string 20 is positioned in the wellbore 10, the drilling fluid may occupy the interior volume of the tubular string 20 as well as the wellbore annulus 22 between the exterior surface 24 of the tubular string 20 and the wellbore wall 16. For interior tubular strings, the tubular string 20 may form a wellbore annulus 22 between the exterior surface 24 and the wellbore wall 16 along part of the length of the tubular string 20 and a casing-casing annulus 32 between the exterior surface 24 and an interior surface 26 of the previously installed tubular string 20. A displacement fluid may be pumped down the fluid conduit 18 after the cement to displace the cement composition from the fluid conduit 18 up into the wellbore annulus 22, casing-casing annulus 32, or both.

Cements commonly used for cementing tubular strings in wellbores or remediating lost circulation zones or water zones may often include a mixture of metal oxides, such as but not limited to calcium oxide (CaO), iron (II) oxide (FeO), iron (III) oxide ($Fe_2O_3$), sodium oxide ($Na_2O$), phosphorus (V) pentoxide ($P_2O_5$), alumina ($Al_2O_3$), magnesium oxide (MgO), potassium oxide ($K_2O$), silica ($SiO_2$), lithium oxide ($Li_2O$), titania ($TiO_2$), dicalcium silicate ($Ca_2SiO_4$) (abbreviated as $C_2S$), tricalcium silicate ($Ca_3SiO_5$) (abbreviated as $C_3S$), tricalcium aluminate ($3CaO \cdot Al_2O_3$, abbreviated $C_3A$), tetracalcium alumina ferrite ($4CaO \cdot Al_2O_3Fe_2O_3$, abbreviated $C_4AF$), other metal oxides, or combinations of these. In particular, cements for wellbore cementing applications may include four main components: tricalcium silicate ($Ca_3SiO_5$) responsible for the early strength development, dicalcium silicate ($Ca_2SiO_4$) responsible for the final strength, tricalcium aluminate ($3CaO \cdot Al_2O_3$) contributing to the early strength, and tetracalcium alumina ferrite ($C_4AF$). These phases are sometimes called alite and belite respectively. In addition, gypsum may be added to control the setting time of cement.

The silicates phase in the cement solid phase (before addition of water) may be about 75 wt. % to 85 wt. % based on the total weight of the solid material in the cement.

Tricalcium silicate ($C_3S$) may be the major constituent of the silicates phase, with concentrations as high as 60 wt. % to 65 wt. % based on the total weight of the solid material in the cement. The quantity of dicalcium silicate normally does not exceed 20 wt. %. However, the concentration of dicalcium silicate may exceed 20 wt. % in the case of retarded cements. The hydration products for tricalcium silicate and dicalcium silicate are calcium silicate hydrate (CSH or $3CaO \cdot 2SiO_2 \cdot 4H_2O$) and calcium hydroxide ($Ca(OH)_2$), which is also known as Portlandite. The calcium silicate hydrate, which may be commonly referred to as CSH gel, may have a variable ratio of calcium to silicate ($Ca:SiO_2$) and variable ratio of hydrogen to silicate ($H:SiO_2$) depending on the temperature, the calcium concentration in the aqueous phase, and the curing time. The calcium silicate hydrate (CSH gel) may comprise +/−70% of fully hydrated Portland cement at ambient conditions and is considered the principal binder of hardened cement. By contrast, the calcium hydroxide is highly crystalline and may be present in concentrations of from 15 wt. % to 20 wt. %, which can be the reason for the high pH of cement.

Upon contact with water, the gypsum in the cement partially dissolves releasing calcium and sulfate ions to react with the aluminate and hydroxyl ions produced by the tricalcium aluminate ($C_3A$) to form a calcium trisulphoaluminate hydrate, which may be known as the mineral Ettringite ($Ca_6Al_2(SO_4)_3(OH)_{12} \cdot 26H_2O$ (abbreviated $C_3A \cdot 3CS \cdot 32H$)). The trisulfo-aluminate hydrate precipitates onto the surfaces of the tricalcium aluminate ($C_3A$), which may prevent further rapid hydration (flash-set) of the tricalcium aluminate. The gypsum is gradually consumed and Ettringite continues to precipitate until the gypsum is consumed. The sulfate ion concentration decreases and the Ettringite will become unstable converting to calcium monosulfoaluminate hydrate. The remaining unhydrated tricalcium aluminate will form calcium aluminate hydrate.

Cement slurry design is based on the altering or inhibition of the hydration reactions with specific additives to achieve certain properties of the cement slurry. Cement must be designed in a way to ensure acceptable properties such as mix ability, stability, rheology, fluid loss, and adequate thickening time. Different chemicals may be used when designing cement slurries. These chemicals may include but are not limited to cement dispersants, retarders, fluid loss additives, gelling agents, gas migration additives, and expansion additives.

As previously discussed, the cement compositions of the present disclosure include at least a cement precursor, water, and a cement dispersant. The cement dispersant comprises a polymer of naphthalene sulfonate that may have a weight average molecular mass of from 2500 g/mol to 3000 g/mol. The naphthalene sulfonate polymer may have a molecular weight distribution generated by a polymerization reaction in which at least 50%, at least 70%, at least 80%, at least 90%, at least 95%, at least 98%, or even at least 99% of the naphthalene sulfonate polymer molecules in the cement dispersant have a molecular weight in a range of from 2500 g/mol to 3000 g/mol. In aspects, the cement dispersant includes a naphthalene sulfonate polymer having a weight average molecular weight of 2774 g/mol. The naphthalene sulfonate polymers may be present in the cement dispersant as a salt of the naphthalene sulfonate polymer, where the anion portion of the salt is the naphthalene sulfonate polymer. The cation of the naphthalene sulfonate polymer salt may be an ammonium cation or a metal cation, such as but not limited to a sodium, lithium, potassium cation, or combinations of these cations. In aspects, the polymer may be a sodium salt of the naphthalene sulfonate polymer. In aspects, the polymer may be the reaction product of polymerization of naphthalene sulfonate monomers with formaldehyde. As discussed in the present disclosure, the application of the polymer of naphthalene sulfonate as a dispersant may provide improved rheological properties to the cement composition, thereby allowing better mixing and placement through pumping of the cement composition. Further, the improved rheological properties provided by the polymer of naphthalene sulfonate as described herein allow for higher densities and increased presence of weighting agents in the cement compositions.

In aspects, the cement dispersant of the present disclosure comprises a polymer that is the reaction product of a polymerization reaction of naphthalene sulfonate monomers, naphthalene sulfonic acid monomers, or combinations of these. Polymers made from naphthalene sulfonates, naphthalene sulfonic acid, or both may be referred to alternatively as polynaphthalene sulfonates or naphthalene sulfonate polymers, and may be present as polymer salts in the cement dispersant in the present disclosure.

In aspects, the polynaphthalene sulfonates may have between 5 and 20 repeating monomer units of naphthalene sulfonate. In aspects, the naphthalene sulfonate is polymerized through contact with formaldehyde. In aspects, the formaldehyde may provide methyl links between adjacent pairs of naphthalene sulfonate monomers in the polynaphthalene sulfonate. In aspects, the sulfonate moeities within the polynaphthalene sulfonates may be anionic. In aspects, the polynaphthalene sulfonate may be a polynaphthalene sulfonate salt comprising cations to balance the sulfonate anions. The cations may be selected from hydrogen, sodium, lithium, ammonium, potassium, or combinations of these. In certain aspects, the cement dispersant is a polynaphthalene sulfonate sodium salt.

In aspects, the cement dispersant includes polymers obtained by polymerization of the mixture shown in Formula I of sodium cations, the naphthalene sulfonates and formaldehyde.

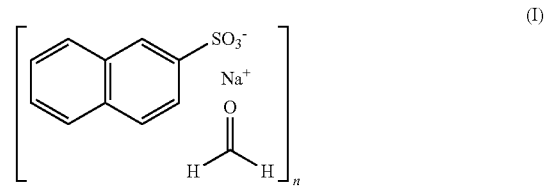

(I)

In Formula I, n=5, 6, 7, 8, 9, 10, 11, 12, 13, 14, 15, 16, 17, 18, 19, or 20. In aspects, the cement dispersant is a mixture of polynaphthalene sulfonates wherein n of Formula I is a combination of at least two of 5, 6, 7, 8, 9, 10, 11, 12, 13, 14, 15, 16, 17, 18, 19, and 20. In aspects, the formaldehyde allows for the polymer of naphthalene sulfonate to form through a condensation reaction with acetone forming as by-product of the condensation reaction. It will be appreciated that in aspects, the sodium of Formula I can be replaced with other cations, such as lithium, ammonium, or potassium. In embodiments, the polynaphthalene sulfonate salts may have a combination of one or more cations selected from the group consisting of sodium, lithium, ammonium, potassium, and combinations of these.

In aspects, the cement dispersant includes polymers obtained by the mixture shown in Formula II of a sodium cation, the anion naphthalene sulfonate, and formaldehyde.

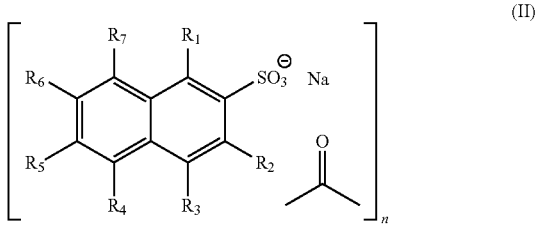

(II)

In Formula II, n=5, 6, 7, 8, 9, 10, 11, 12, 13, 14, 15, 16, 17, 18, 19, or 20. In Formula II, $R_1$, $R_2$, $R_3$, $R_4$, $R_5$, $R_6$, and $R_7$ are each independently selected from hydrogen or a hydrocarbyl of between 1 and 10 carbons in length.

In aspects, the polynaphthalene sulfonate includes naphthalene sulfonates linked by methyl groups to form the polynaphthalene sulfonates. In aspects, polymerization with formaldehyde provides the linking methyl group. In aspects, the polynaphthalene sulfonate is a linear polymer. In aspects, the polynaphthalene sulfonate is a branched polymer. In aspects, the formaldehyde links naphthalene sulfonate at the 5 and 8 carbon position of the naphthalene ring. In aspects, the formaldehyde links naphthalene sulfonate at least one of the 5, 6, 7, or 8 position of the naphthalene ring. In aspects, the formaldehyde links one naphthalene sulfonate molecules to other naphthalene sulfonate molecules at the 5 and 8 positions. In aspects, the formaldehyde links one naphthalene sulfonate molecules to other naphthalene sulfonate molecules at the 5 and 8 positions and at the 6 position and 7 position. In aspects, the formaldehyde links one naphthalene sulfonate molecule to another naphthalene sulfonate molecule at the 1, 2, 3, and 4 position.

As identified in Formulas I and II, the sulfonate is attached at the 2 position of the naphthalene ring. In aspects, the naphthalene sulfonate is 2-naphthalene sulfonate. It will be appreciated that naphthalene sulfonate may include 1-naphthalene sulfonate. In aspects, the naphthalene sulfonate is a mixture of 1-naphthalene sulfonate and 2-naphthalene sulfonate. In aspects, the cement dispersant may include unreacted naphthalene sulfonate monomers.

The polynaphthalene sulfonates in the cement dispersant may have a weight average molecular weight of less than 5000 g/mol, such as less than or equal to 4000 g/mol, or even less than 3000 g/mol. In embodiments, the polynaphthalene sulfonates in the cement dispersant may have a weight average molecular weight of from 2500 to 3000 g/mol, including from 2600 to 2900 g/mol, from 2700 to 2800 g/mol, from 2710 to 2790 g/mol, from 2720 to 2780 g/mol, from 2730 to 2780 g/mol, from 740 to 2780 g/mol, from 2750 to 2780 g/mol, from 760 to 2780 g/mol, or from 2770 to 2780 g/mol. In aspects, the cement dispersant has a weight average molecular weight of from 2770 to 2780 g/mol, including 2771, 2772, 2773, 2774, 2775, 2776, 2777, 2778, and 2779 g/mol. In aspects, the cement dispersant has a weight average or mean or median molecular weight of 2770 to 2780, including 2771, 2772, 2773, 2774, 2775, 2776, 2777, 2778, and 2779 g/mol. In embodiments, the cement dispersant may include a mixture of polynaphthalene sulfonates having different weight average molecular weights, such that the molecular weight distribution of the polynaphthalene sulfonates is polymodal (having two or more peaks), such as but not limited to bi-modal or tri-modal. In aspects, the polynaphthalene sulfonates in the cement dispersant may have a molecular weight distribution in which at least 50%, at least 70%, at least 80%, at least 90%, at least 95%, at least 98%, or even at least 99% of the polymerized naphthalene sulfonate molecules have a molecular weight in the range of from 2500 g/mol to 3000 g/mol. As set forth in the examples herein, shorter-length, lower molecular weight polymers of naphthalene sulfonate show excellent dispersing effect in cements. In aspects, the low molecular weight polymers of naphthalene sulfonate may improve dispersing and rheology in higher class cements, such as Class G cements.

In aspects, the cement dispersant includes polynaphthalene sulfonate at an amount of from 50 to 100% by weight of the cement dispersant. In aspects, polynaphthalene sulfonates comprise at least 50%, at least 60%, at least 70%, at least 75%, at least 80%, at least 90%, at least 91%, at least 92%, at least 93%, at least 94%, at least 95%, at least 95%, or at least 99% by weight of the cement dispersant.

In aspects, the cement dispersant, in addition to the polynaphthalene sulfonates, may include at least one of a cation, acetone, formaldehyde, water, or combinations of these. In aspects, the cement dispersant may include water at an amount of from 3 to 50% by weight of the cement dispersant, including 3 to 40%, 3 to 30%, 3 to 20%, 3 to 10%, 3 to 8%, 3 to 7%, 3 to 6%, and 3 to 5% by weight of the cement dispersant. In aspects, the cement dispersant includes acetone at an amount of from about 0.1 to 25% by weight of the cement dispersant. In aspects, the cement dispersant includes formaldehyde at 10% or less by weight of the cement dispersant, such as from 0% to 10% by weight based on the total weight of the cement dispersant. As previously discussed, the cement dispersant may also include unreacted naphthalene sulfonate monomers.

In aspects, the cement dispersant of the present disclosure may have a specific gravity of from 0.65 to 0.7 based on the density of water at 4° C.

In further aspects, the cement dispersant may improve the rheological properties of the cement composition, which may increase or improve the flow or the density of the cement composition. In some aspects, the cement composition may have an amount of the cement dispersant of from 0.001 to 10% BWOC, including from 0.005 to 5% BWOC, from 0.005 to 3% BWOC, from 0.005 to 2% BWOC, from 0.005 to 1% BWOC, from 0.1 to 2% BWOC, or from 0.1 to 1% BWOC. In aspects, the cement composition may include from 0.01% BWOC to 1.0% BWOC cement dispersant.

As identified herein, the cement dispersants of polynaphthalene sulfonates having a weight average molecular weight of from 2500 g/mol to 3000 g/mol can improve the rheological properties of a cement slurry, thereby improving the quality of the cement slurry for the purposes of mixing and placement of the cement slurry. The cement dispersants of the present disclosure may lower the frictional properties of the cement slurry, which can thereby reduce the pumping rate required to obtain turbulent flow. In aspects, the cement dispersants of the present disclosures can reduce the surface pumping pressure. In further aspects, the cement dispersants of the present disclosure can reduce the horsepower needed to pump a cement slurry into a wellbore. In aspects, the cement dispersants of the present disclosure provide a cement with improved rheology, such that reliance on the volume of water for pouring the cement in place is reduced. The cement dispersant can therefore accommodate a higher ratio of solids to water. In aspects, the improved rheology provided by the cement dispersant may allow for high-density cement slurries without needing a weighting agent. In aspects, the cement dispersant may be combined with a weighting agent to further increase the density of the cement composition.

As previously discussed, the polynaphthalene sulfonates can have a weight average molecular weight of from 2500 g/mol to 3000 g/mol. The desired molecular weight or range thereof of the polymer of naphthalene sulfonate can be achieved by controlling certain parameters during the polymerization process to reduce or prevent formation of larger polymers outside of the molecular weight range. In some aspects, the cement dispersant can be prepared under controlled reaction conditions to limit the level of polymerization such that a weight average molecular mass of from 2500 g/mol to 3000 g/mol of polynaphthalene sulfonate is achieved. Polymerization can be controlled by controlling the amount of starting materials provided for the reaction, or the rate at which formaldehyde is added to naphthalene sulfonate salts. In aspects, the reaction can be controlled by the amount of formaldehyde provided to the condensation reaction. In aspects, the degree of polymerization can be controlled by the amount of naphthalene sulfonate salt provided to the condensation reaction. In aspects, polymerization can be controlled by step-wise growth controls as the condensation between the formaldehyde and naphthalene sulfonate salt occurs. In aspects, controlling the reaction time or temperature can also allow for obtaining the desired degree of polymerization. Other factors for consideration to achieve the desired degree or amount of polymerization include the purity of the formaldehyde and the naphthalene sulfonate, the stoichiometric ratio between the two components, pressure conditions of the reaction, and removing water formed during the condensation process. In aspects, the polymerization reaction can be ceased or terminated by the introduction of a neutralizing substance, such as sodium hydroxide, calcium oxide, or combinations thereof. In aspects, the cement dispersant may be prepared in a solid phase or powder.

Figure 2:
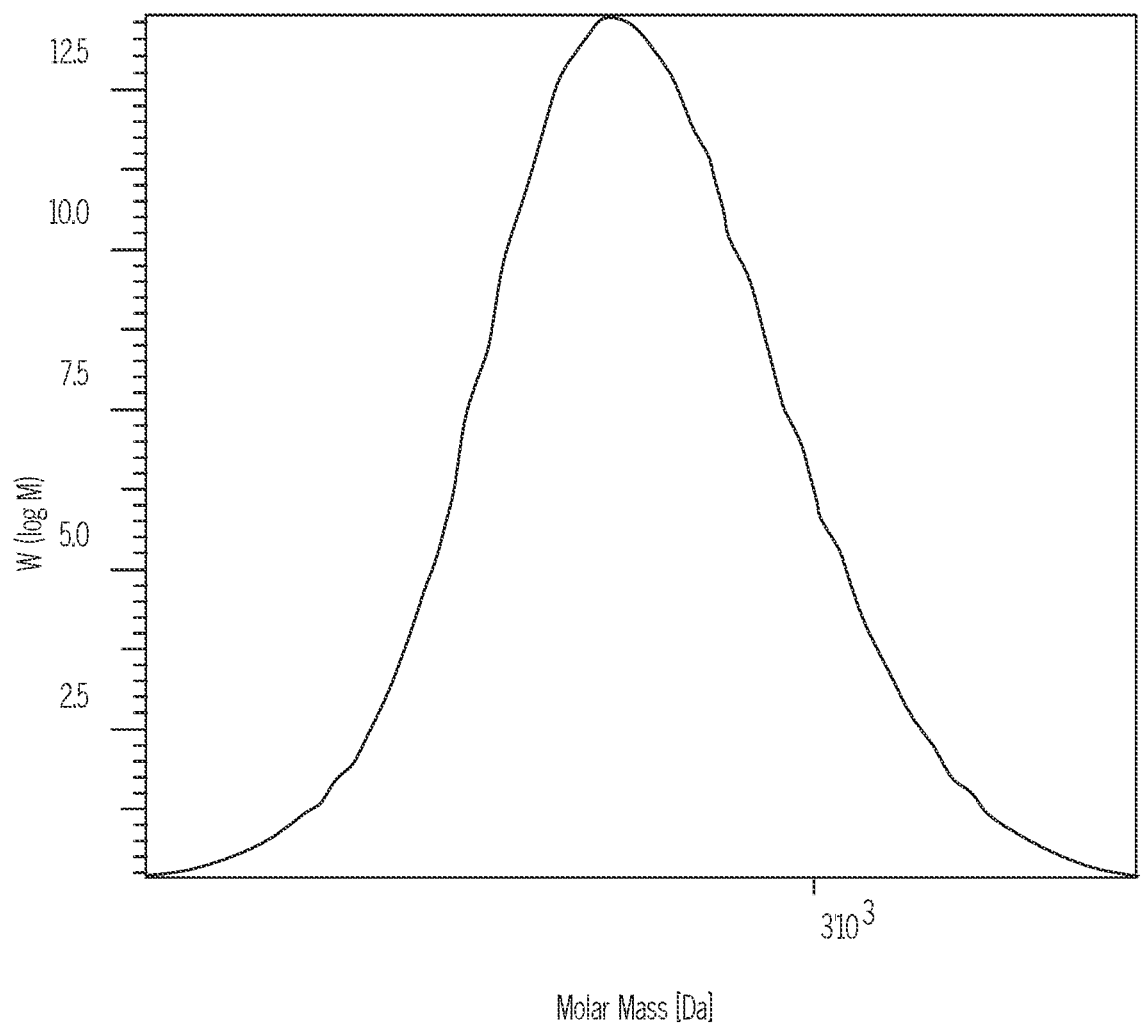
FIG. 2 graphically depicts the molar mass distribution of the polymer dispersant of the present disclosure, according to one or more embodiments shown and described in the present disclosure.
Figure 3:
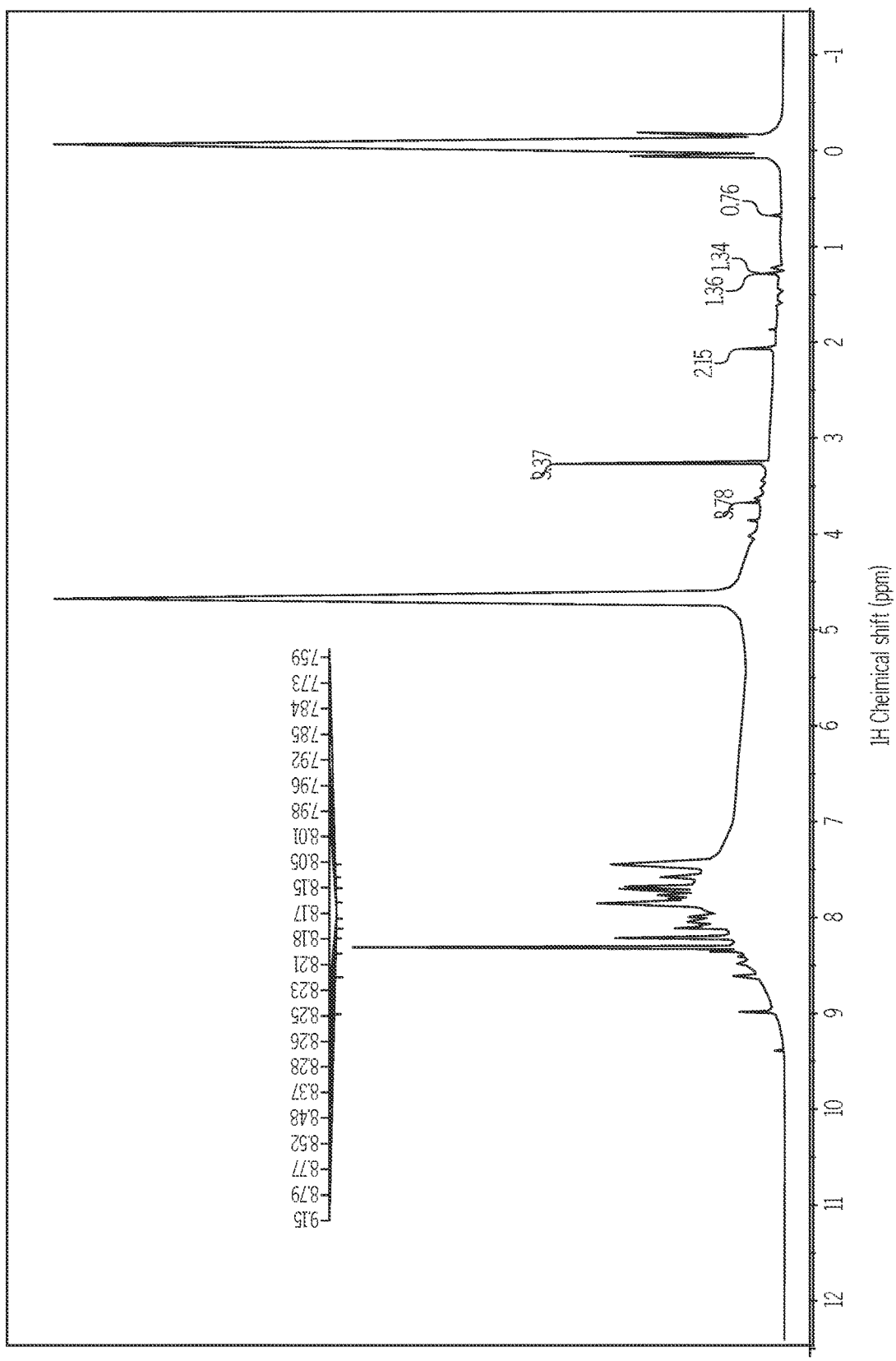
FIG. 3 graphically depicts an $^1$H-NMR spectrum obtained for the polymer dispersant of the present disclosure, according to one or more embodiments shown and described in the present disclosure.
Figure 4:
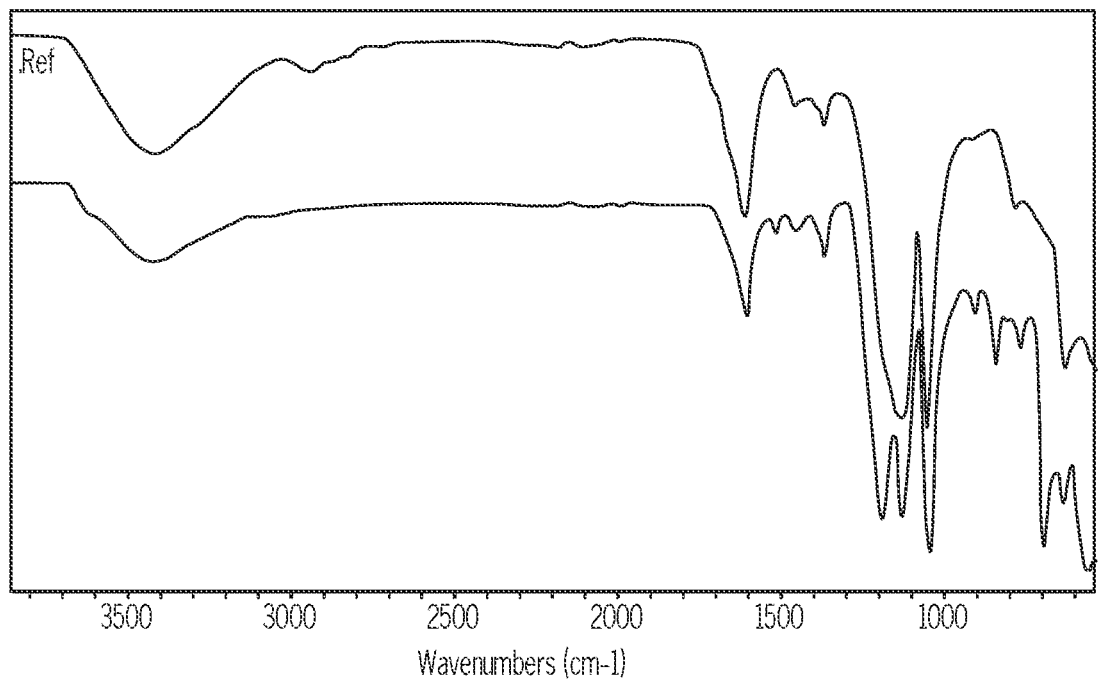
FIG. 4. graphically depicts stacked Fourier Transformed Infrared (FTIR) spectroscopy spectra to show the difference between a reference dispersant (CFR-3) (top line) and the polymer dispersant of the present disclosure (bottom line), according to one or more embodiments shown and described in the present disclosure.
Figure 5:
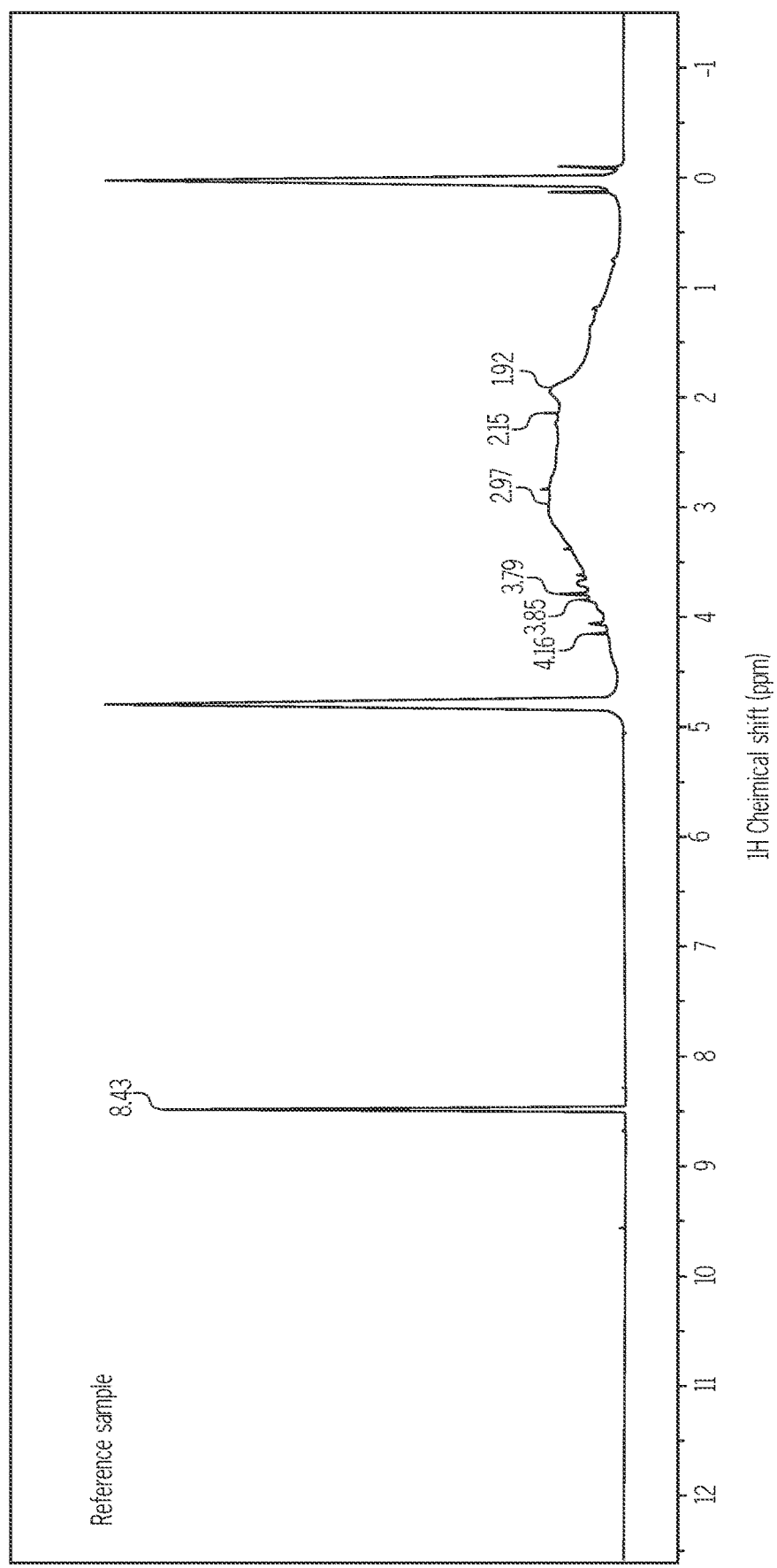
FIG. 5. graphically depicts an $^1$H-NMR spectrum obtained for the reference dispersant (CFR-3).

Referring now to FIG. 2, a molecular weight distribution of one embodiment of the polynaphthalene sulfonates of the cement dispersant of the present disclosure is graphically depicted. The molecular weight distribution in FIG. 2 indicates that the cement dispersant can include a mixture of polynaphthalene sulfonates of various molecular weights, where the weight average molecular weight is less than 5000 g/mol and the majority of the molecules have a molecular weight between 2500 and 3000 g/mol. Referring now to FIG. 3, an $^1$H NMR spectrum of one embodiment of the cement dispersant is graphically depicted. The $^1$H NMR spectrum in FIG. 3 shows the dispersant spectra obtained using standard acquisition parameters. Table 1 sets forth the characterization and chemical shifts seen in the spectrum of FIG. 3. In FIG. 3, the proton peaks between 7.4 ppm and 9.5 ppm confirm the presence of the naphthalene ring and the sulfonate groups.

TABLE 1

| Chemical shift (δ) ppm | Interested proton H |
|---|---|
| 4.75 ppm | D2O (reference solvent) |
| Around 9.5 ppm | 2H of formaldehyde |
| 7.4-8 ppm | Protons from naphthalene ring |
| 7.92 ppm | Protons next to sulfonic group ($H_a$) |
| 7.4-7.7 ppm | Proton next to sulfonic group ($H_b$) |
| (3.3 ppm-4 ppm) | Water content ($H_2O$) |

In aspects, the cement dispersant may consist or consist essentially of a polymer of naphthalene sulfonate salt with a molecular mass of from about 2500 to about 3000 g/mol. In aspects, the cement dispersant may consist or consist essentially of a polymer of naphthalene sulfonate salt, water, acetone, and formaldehyde. In aspects, the cement dispersant consists or consists essentially of water, acetone, formaldehyde, and a polynaphthalene sulfonate sodium salt with a molecular mass or molecular mass range of about 2500 to about 3000 g/mol. In aspects, the cement dispersant consists or consists essentially of water, acetone, formaldehyde, and a polynaphthalene sulfonate sodium salt with a weight average or mean or median molecular weight of about 2770 to about 2780.

In aspects, the cement composition includes a cement dispersant of polynaphthalene sulfonate salt, where the concentration of the cement dispersant in the cement composition is from 0.1 to 1.0% BWOC. In aspects, the cement composition includes a cement dispersant of polynaphthalene sulfonate salt with a weight average molecular weight of from 2500 to 3000 g/mol, where the concentration of the cement dispersant in the cement composition is from 0.1 to 1.0% BWOC.

In addition to the cement dispersant, the cement compositions of the present disclosure further include at least a cement precursor and water. The cement compositions may further include one or more of silica sand, silica flour, weighting agents, cement retarders, defoamers, gelling agents, or combinations of these. The cement compositions may also include one or more additives, such as but not limited to, one or more of an expansion additive, a friction reducer, a gas block stabilizer, a gelling agent, a surfactant, a latex, latex stabilisers, epoxy resins, epoxy curing agents, or combinations of these. Other constituents known in the art of primary cementing may also be incorporated into the cement compositions.

The cement precursors may be any suitable material which, when mixed with water, can be cured into a cement. The cement precursors may include hydraulic or non-hydraulic cement precursors. A hydraulic cement precursor may include a mixture of limestone, clay, and gypsum burned together at temperatures greater than 1,000 degrees Celsius (° C.). Cement compositions prepared with hydraulic cement precursors may harden instantly or within a few minutes when contacted with water. A non-hydraulic cement precursor may include mixtures of lime, gypsum, plasters, and oxychlorides. Cement compositions prepared with non-hydraulic cement precursors may take longer to harden or may require drying conditions for proper strengthening, but may be more economically feasible. The cement precursor may include one or more classes of cement precursors identified by the American Petroleum Institute (API), such as an API Class G cement. The cement precursors may comprise, consist of, or consist essentially of a Portland cement precursor, such as but not limited to a Class G Portland cement. Portland cement is a hydraulic cement precursor (cement precursor material that not only hardens by reacting with water but also forms a water-resistant product) produced by pulverizing clinkers, which contain hydraulic calcium silicates and one or more of the forms of calcium sulfate as an inter-ground addition. The cement precursors may include Saudi Class G cement precursors, which may include a mixture of Portland cement and crystalline silica, which may be referred in the alternative as quartz.

The cement precursors may include one or more of calcium hydroxide, silicates, oxides, belite ($Ca_2SiO_4$), alite ($Ca_3SiO_5$), tricalcium aluminate ($Ca_3Al_2O_6$), tetracalcium aluminoferrite ($Ca_4Al_2Fe_2O_{10}$), brownmilleriate ($4CaO \cdot Al_2O_3 \cdot Fe_2O_3$), gypsum ($CaSO_4 \cdot 2H_2O$), sodium oxide, potassium oxide, limestone, lime (calcium oxide), hexavalent chromium, trivalent chromium, calcium aluminate, or combinations of these. The cement precursor material may include Portland cement, siliceous fly ash, calcareous fly ash, slag cement, silica fume, quartz, other cement precursor material, or any combination of these.

The cement compositions may include Saudi Class G cement as the cement precursor. In embodiments, the cement precursors may consist or consist essentially of Saudi Class G cement. Saudi Class G cement may include from 60 wt. % to 100 wt. %, from 60 wt. % to 99 wt. %, from 60 wt. % to 97 wt. %, from 60 wt. % to 95 wt. %, from 60 wt. % to 90 wt. %, from 60 wt. % to 80 wt. %, from 70 wt. % to 100 wt. %, from 70 wt. % to 99 wt. %, from 70 wt. % to 97 wt. %, from 70 wt. % to 95 wt. %, from 70 wt. % to 90 wt. %, from 70 wt. % to 80 wt. %, from 80 wt. % to 100 wt. %, from 80 wt. % to 99 wt. %, from 80 wt. % to 97 wt. %, from 80 wt. % to 95 wt. %, from 80 wt. % to 90 wt. %, from 90 wt. % to 100 wt. %, from 90 wt. % to 99 wt. %, from 90 wt. % to 97 wt. %, from 90 wt. % to 95 wt. %, from 95 wt. % to 100 wt. %, or from 95 wt. % to 99 wt. % Portland cement based on the total weight of the Saudi Class G cement precursor. Saudi Class G cement precursor may include less than 40 wt. %, less than 30 wt. %, less than 20 wt. %, less than 10 wt. %, less than 5 wt. %, less than 3 wt. %, or even less than 1 wt. % crystalline silica, or quartz based on the total weight of the Saudi Class G cement precursor. Saudi Class G cement precursor may have a pH greater than 7, such as from 8 to 14, from 10 to 13, from 11 to 13, from 12 to 13, or 12.4. Saudi Class G cement may have a bulk density at 20° C. of from 70 pounds per cubic foot (lb/ft$^3$) (1121 kilograms per cubic meter (kg/m$^3$), where 1 lb/ft$^3$ equals 16.0185 kg/m$^3$) to 120 lb/ft$^3$ (1922 kg/m$^3$), from 80 lb/ft$^3$ (1281 kg/m$^3$) to 110 lb/ft$^3$ (1762 kg/m$^3$), or from 90 lb/ft$^3$ (1442 kg/m$^3$) to 100 lb/ft$^3$ (1602 kg/m$^3$), or 94 lb/ft$^3$ (1506 kg/m$^3$). Saudi Class G cement precursor may have a solubility in water of from 0.1 grams per 100 milliliters (g/100 ml) to 2 g/100 ml, from 0.1 g/100 ml to 1 g/100 ml, from 0.1 g/100 ml to 0.8 g/100 ml, from 0.1 g/100 ml to 0.5 g/100 ml, from 0.2 g/100 ml to 2 g/100 ml, from 0.2 g/100 ml to 1 g/100 ml, from 0.2 g/100 ml to 0.8 g/100 ml, from 0.2 g/100 ml to 0.5 g/100 ml, from 0.5 g/100 ml to 2 g/100 ml, from 0.5 g/100 ml to 1 g/100 ml, from 0.5 g/ml to 0.8 g/100 ml, or 0.5 g/100 ml. In embodiments, the cement precursor is not a geopolymer cement.

In aspects, the cement precursor may include tricalcium silicate, dicalcium silicate, tricalcium aluminate, and tetracalcium alumina ferrite. In embodiments, the cement precursor may further include gypsum. The cement precursor may include from 75 wt. % to 85 wt. % silicates (tricalcium silicate, dicalcium silicate, and any other silicates) based on the total weight of the cement precursor. In embodiments, the cement precursor may include from 60 wt. % to 65 wt. % tricalcium silicate based on the total weight of the cement precursor. In embodiments, the cement precursor may include from 1 wt. % to 20 wt. % dicalcium silicate based on the total weight of the cement precursor.

The cement compositions may include an amount of cement precursor sufficient to produce a hard rigid cement upon curing. The cement compositions may include greater than or equal to 10 wt. %, greater than or equal to 20 wt. %, greater than or equal to 30 wt. %, or greater than or equal to 50 wt. % cement precursors based on the total weight of the cement composition. The cement compositions may include less than or equal to 80 wt. %, less than or equal to 70 wt. %, or even less than or equal to 60 wt. % cement precursors based on the total weight of the cement composition. The cement compositions may include from 10 wt. % to 80 wt. %, from 10 wt. % to 70 wt. %, from 10 wt. % to 60 wt. %, from 10 wt. % to 50 wt. %, from 20 wt. % to 80 wt. %, from 20 wt. % to 70 wt. %, from 20 wt. % to 60 wt. %, from 20 wt. % to 50 wt. %, from 30 wt. % to 80 wt. %, from 30 wt. % to 70 wt. %, from 30 wt. % to 60 wt. %, from 30 wt. % to 50 wt. %, from 50 wt. % to 80 wt. %, from 50 wt. % to 70 wt. %, or from 50 wt. % to 60 wt. % cement precursors based on the total weight of the cement composition. In embodiments, the cement compositions may include from 80 wt. % to 90 wt. % cement precursors based on the total weight of the cement composition.

In aspects, the cement compositions include water, or at least include water in the preparation thereof. Water may be added to the cement precursor and other constituents to produce the cement compositions in the form of a slurry. The water in the cement compositions may include distilled water, deionized water, reverse osmosis (RO) water, filtered water, well water, or tap water. The water used to produce the cement compositions may be in the form of an aqueous solution containing various additives or impurities. The water may include freshwater or seawater, natural or synthetic brine, salt water, municipal water, well water, formation water, produced water, brackish water, or combinations of these. Salts or other organic compounds may be incorporated into the water to control certain properties of the water, and thus control properties of the cement composition, such as density. Suitable salts may include, but are not limited to, alkali metal chlorides, hydroxides, or carboxylates. In embodiments, salts present in the water may include, but are not limited to, sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these. The water may be substantially free of salts, such as having less than 1 wt. % salts based on the total weight of the water. The water may have less than 0.1 wt. % salts or even less than 0.01 wt. % salts based on the total weight of the water.

The cement compositions may include an amount of water sufficient to allow the cement composition slurry to be pumped into the annulus or into a lost circulation zone or water zone of a wellbore. The amount of water may be sufficient to cause curing of the cement composition. The cement compositions may have greater than or equal 5 wt. %, greater than or equal to 10 wt. %, or greater than or equal 15 wt. % water based on the total weight of the cement composition. The cement compositions may include less than or equal to 70 wt. %, less than or equal to 60 wt. %, less than or equal to 50 wt. %, or even less than or equal to 40 wt. % water based on the total weight of the cement composition. The cement compositions may include from 5 wt. % to 70 wt. %, from 5 wt. % to 60 wt. %, from 5 wt. % to 50 wt. %, from 5 wt. % to 40 wt. %, from 5 wt. % to 20 wt. %, from 10 wt. % to 70 wt. %, from 10 wt. % to 60 wt. %, from 10 wt. % to 50 wt. %, from 10 wt. % to 40 wt. %, from 15 wt. % to 70 wt. %, from 15 wt. % to 60 wt. %, from 15 wt. % to 50 wt. %, or from 15 wt. % to 40 wt. % water based on the total weight of the cement composition.

As previously discussed, the cement compositions may include at least one of silica sand, silica flour, weighting agents, defoamers, or combinations of these. Silica sand, silica flour, or both may be included in the cement compositions as strength stabilizing agents. Silica sand, silica flour, or both, may be used to stabilize the strength and permeability of the cement compositions at downhole temperatures between 230° F. and 700° F. (110° C. and 371° C.), prevent strength retrogression, and decrease the permeability of the cured cement. Silica sand may include any naturally-occurring or man-made silica sand. The silica sand may have an average particle size of from 100 micrometers (μm) (microns) to 200 μm, from 100 μm to 180 μm, from 100 μm to 175 μm, from 150 μm to 200 μm, from 150 μm to 180 μm, from 150 μm to 175 μm, from 175 μm to 200 μm, or from 180 μm to 200 μm. The cement compositions may include from 0% BWOC to 50% BWOC silica sand, from 0% BWOC to 20% BWOC, from 0% BWOC to 10%, BWOC, from 1% BWOC to 50% BWOC, from 1% BWOC to 20% BWOC, from 1% BWOC to 10% BWOC, from 10% BWOC to 50% BWOC, or from 10% to 20% BWOC silica sand. In embodiments, the cement compositions may be substantially free of silica sand, such as having less than 1% BWOC, less than 0.1% BWOC, or even less than 0.01% BWOC silica sand. In embodiments, the cement compositions do not include silica sand.

The silica flour may be any naturally-occurring or man-made silica flour. The silica flour may have an average particle size less than the silica sand. The silica flour may have an average particle size less than 100 μm, less than or equal to 75 μm, less than or equal to 50 μm, less than or equal to 25 μm, less than or equal to 15 μm, or even less than or equal to 10 μm. The silica flour may have an average particle size of from 1 μm to less than 100 μm, from 1 μm to 75 μm, from 1 μm to 50 μm, from 1 μm to 25 μm, from 1 μm to 15 μm, from 5 μm to less than 100 μm, from 5 μm to 75 μm, from 5 μm to 50 μm, from 5 μm to 25 μm, or from 5 μm to 15 μm. The silica flour may be used in combination with silica sand to formulate the cement composition with a density of from 130 lb/ft$^3$ (2082 kg/m$^3$) to 165 lb/ft$^3$ (2643 kg/m$^3$), which may provide for resistance of gas migration problems through the cured cement. The combination of the silica sand and silica flour may increase the solids packing density of the cement compositions and thus reduce the permeability of the cured cement to gas flow, among other features.

The cement compositions may include from greater than 0% BWOC to 50% BWOC, from greater than 0% BWOC to 40% BWOC, from greater than 0% BWOC to 30% BWOC, from greater than 0% BWOC to 20% BWOC, from 1% BWOC to 50% BWOC, from 1% BWOC to 40% BWOC, from 1% BWOC to 30% BWOC, from 1% BWOC to 20% BWOC, from 5% BWOC to 50% BWOC, from 5% BWOC to 40% BWOC, from 5% BWOC to 30% BWOC, from 5% BWOC to 20% BWOC silica flour. In embodiments, the cement compositions may be substantially free of silica flour, such as having less than 1% BWOC silica flour, less than 0.1% BWOC, or even less than 0.01% BWOC silica flour. In embodiments, the cement compositions do not include silica flour.

In some aspects, the cement compositions may include a cement retarder. Cement retarders are cement additives whose function is to retard or delay the setting or thickening of cement slurries. For a wellbore with a downhole temperature of 125° F. (50° C.) or less, cement retarders are generally not needed. However, as temperature increases, the hydration process of tricalcium silicates increases and, hence, the thickening time decreases. The decrease in thickening time may cause problems in that the cement compositions may thicken to the point that they are no longer pumpable before the cement composition can be fully deployed, such as fully displaced into the annulus or fully injected into a lost circulation zone or water zone. Examples of cement retarders may include, but are not limited to lignosulfonates, modified lignosulfonates, purified lignosulfonates, citric acid, tartaric acid, hydroxyethyl cellulose, carboxymethyl hydroxyethyl cellulose, organophosphates, boric acid, borax, zinc oxide, maelic anhydride, 2-acrylamido-2-methylpropanesulfonic acid copolymers, other cement retarders, or combinations of cement retarders.

The cement compositions may include the cement retarder at an amount of 0.001 to about 10% BWOC, including 0.001 to 9% BWOC, 0.001 to 5% BWOC, 0.001 to 1% BWOC, 0.01 to 9% BWOC, 0.01 to 5% BWOC, 0.01 to 1% BWOC, 0.1 to 9% BWOC, 0.1 to 5% BWOC) 0.1 to 1% BWOC, 1 to 9% BWOC, and 1 to 5% BWOC. In some aspects, the cement compositions may be substantially free of cement retarders, such as having less than 0.01% BWOC silica flour, less than 0.001% BWOC, or even less than 0.001% BWOC cement retarder. In embodiments, the cement compositions do not include a cement retarder.

As previously discussed, the cement compositions may include a weighting agent, which may also be referred to as a "weighting material" or "weight material." The weighting agent may include particulate solids having a specific gravity (SG) sufficient to increase the density of the cement slurry. As identified herein, by the cement dispersant providing improved rheological properties to the cement, higher amounts of weighting agent(s) can be included while still retaining good ability to move the cement composition into place to set. Examples of weighting agents may include, but are not limited to, sand, barite (barium sulfate), hematite, calcium carbonate, siderite, ilmenite, silica sand, manganese oxide (MnO), hausmanite (manganese tetroxide ($Mn_3O_4$)), zinc oxide, zirconium oxide, iron oxide, fly ash, or any combination of these weighting agents. The cement compositions may include one weighting agent or a combination of two or more different weighting agents, each with different properties. The weighting agent may have a specific gravity (SG) of from 2 to 6, from 2 to 5, from 3 to 6, or from 3 to 5. The weighting agents may have a mean particle size distribution of from 0.1 μm to 50 μm, from 0.1 μm to 40 μm, from 0.1 μm to 30 μm, from 0.1 μm to 20 μm, from 0.1 μm to 10 μm, from 10 μm to 50 μm, from 10 μm to 40 μm, from 10 μm to 30 μm, from 10 μm to 20 μm, from 20 μm to 50 μm, from 20 μm to 40 μm, from 20 μm to 30 μm, from 30 μm to 50 μm, from 30 μm to 40 μm, or from 40 μm to 50 μm.

The cement compositions may include weighting agent(s) at from 10% BWOC to 150% BWOC, from 10% BWOC to 125% BWOC, from 10% BWOC to 100% BWOC, from 10% BWOC to 75% BWOC, from 10% BWOC to 50% BWOC, from 20% BWOC to 150% BWOC, from 20% BWOC to 125% BWOC, from 20% BWOC to 100% BWOC, from 20% BWOC to 75% BWOC, from 20% BWOC to 50% BWOC, from 50% BWOC to 150% BWOC, from 50% BWOC to 125% BWOC, from 50% BWOC to 100% BWOC, from 50% BWOC to 75% BWOC, from 75% BWOC to 150% BWOC, or from 100% BWOC to 150% BWOC. As also identified herein, the cement dispersant can improve or modify the rheological properties of the slurry, thereby improving the quality of the slurry for the purposes of mixing and placement. In some aspects, the cement dispersant provides a high solids-to-water ratio for the slurry with good rheological properties, allowing for high-density slurries with a high pound mass per gallon without needing a weighting additive. In some aspects, the cement compositions may be substantially free of weighting agents, such as having less than 1% BWOC, less than 0.1% BWOC, or even less than 0.01% BWOC weighting agents. In other aspects, the cement compositions do not include weighting agents.

The addition of one or more of these weighting agent components to the cement compositions may reduce settling in the cement compositions. In embodiments, the inclusion of one or more of the silica sand, silica flour, weighting agent, or combinations of these may reduce the porosity of the cement compositions by including different particles size distributions of particles and components.

In some aspects, the cement compositions of the present disclosure may contain one or more gelling agents. In some aspects, a gelling agent may include a cellulose, a cellulose derivative, a polysaccharide, a methyl cellulose, a cellulose ether, a dilutan gum, polyacrylamide, and combinations thereof. Such gelling agents may be included in the cement compositions to increase the thickening of the cement. In certain aspects, the cement composition may be substantially free or devoid of a gelling agent.

The cement composition may include a surfactant or a defoamer to reduce the foam formed when mixing the cement. The cement compositions may include from 0.1% BWOC to 10% BWOC surfactant. The cement compositions may include one or a plurality of defoamers. The defoamers, or "anti-foam additives," may be added to the cement compositions to prevent frothing, foaming, and vapor entrapment that may occur during the mixing process of a cement slurry. The cement compositions may include less than 5 gps defoamer, where gps refers to U.S. gallons per sack of cement precursor. The cement compositions may include less than or equal to 1 gps defoamer, or even less than or equal to 0.5 gps defoamer. In embodiments, the cement compositions may be substantially free of defoamers, such as having less than 0.1% BWOC, or even less than 0.01% BWOC defoamer. In other aspects, the cement compositions do not include defoamer(s) or surfactant(s).

In some aspects, the cement compositions may further include one or a plurality of latex additives and a latex stabilizer. As used in this disclosure, "latex" may refer to rubber materials commercially available in aqueous latex form, such as aqueous dispersions or emulsions. Latex additives may be added to the cement compositions to enhance the mechanical properties of the cured cement, such as but not limited to decreasing the elastic modulus, improving the tensile strength, and improving the compressive strength of the cured cement. Decreasing the elastic modulus of the cured cement may reduce brittleness, which may improve performance of the cement compositions in cementing zones that produce gas with gas flow potentials and formation gas pressures in ranges that can cause concern for production.

The latex additives may include an aqueous fluid and a solid elastomer. The latex additive can be any type of preformed latex containing the solid elastomer dispersed in the aqueous fluid to form an emulsion. The amount of aqueous fluid in the latex additive can be about 50 wt. % based on the total weight of the latex additive. The aqueous latex additive can be formed by polymerization of monomers in an emulsion polymerization process, where the polymerization of monomers forms the dispersed solid elastomer. The aqueous fluid may be water from any of the sources of water previously discussed in the present disclosure.

The solid elastomer can be any film forming elastomer containing butadiene monomers, styrene monomers, acrylonitrile monomers, ethylene monomers, vinyl acetate monomers, and combinations of these monomers. In embodiments, the solid elastomer may include butadiene monomer, styrene monomer, acrylonitrile monomer, and combinations of the same. In embodiments, the solid elastomer may include a combination of ethylene monomer and vinyl acetate monomer. The ratio of the different monomers can vary depending on the solid elastomer. The solid elastomer can also include a polar monomer in an amount from 1 wt. % to 10 wt. % based on the total weight of the solid elastomer. Examples of polar monomers can include but are not limited to acrylic acid salt and 2-acrylamide-2-methyl propane sulfonic acid salt. The polar monomer can be present to reinforce the stability of the emulsion of the aqueous latex. Examples of solid elastomers employed in latex additives may include, but are not limited to, natural rubbers such as (cis-1,4-polyisoprene), modified types of these natural rubbers, synthetic polymers, or combinations of these. The synthetic polymers may include styrene/butadiene rubber, cis-1,4-polybutadiene, high styrene resin, butyl rubber, ethylene/propylene rubber, neoprene rubber, nitrile rubber, cis-1,4-polyisoprenerubber, silicone rubber, chlorosulfonated rubber, polyethylene rubber, epichlorohydrin rubber, fluorocarbon rubber, fluorosilicone rubber, polyurethane rubber, polyacrylic rubber, or polysulfide rubber. The aqueous latex additives can be commercially available aqueous latex additives. The aqueous latex additives can also include one or more liquid elastomers dispersed in the aqueous latex additive.

The cement compositions may include a latex and latex additive at from 0.0% BWOC to 50% BWOC, from 0.0% BWOC to 30% BWOC, from 0.0% BWOC to 20% BWOC, from 0.1% BWOC to 50% BWOC, from 0.1% BWOC to 30% BWOC, from 0.1% BWOC to 20% BWOC, from 1% BWOC to 50% BWOC, from 1% BWOC to 30% BWOC, from 1% BWOC to 20% BWOC, from 5% BWOC to 50% BWOC, from 5% BWOC to 30% BWOC, or from 5% BWOC to 20% BWOC. In some aspects, the cement compositions may be substantially free of latex and latex additive(s), such as having less than 1% BWOC or even less than 0.1% BWOC latex and latex additive. In other aspects, the cement compositions do not include a latex and a latex additive.

When the latex additive is present, the cement compositions may include a latex stabilizer, which may be operable to reduce or prevent de-emulsification of the latex additive when contacted with water in the cement composition. The latex stabilizer may include one or more surfactants operable to maintain the emulsion of the latex additive. The surfactant of the latex stabilizer can be any type of surfactant capable of stabilizing the latex additive. Examples of the surfactant can include anionic surfactants, non-ionic surfactants, or combinations of these surfactants. Examples of anionic surfactants can include, but are not limited to, sodium dodecylbenzene sulfonate, sodium lauryl sulfonate, a sulfate salt of a nonylphenol ethoxylate containing 20-40 moles of ethylene oxide, or combinations of these surfactants. Examples of the non-ionic surfactants can include, but are not limited to, a nonylphenol ethoxylate containing 20-40 moles of ethylene oxide. The cement compositions may include from 0.0% BWOC to 10% BWOC latex stabilizer, such as from 0.1% BWOC to 10% BWOC, from 0.1% BWOC to 5% BWOC, from 1% BWOC to 10% BWOC, or from 1% BWOC to 5% BWOC latex stabilizer. In some aspects, the cement compositions may be substantially free of latex stabilizers, such as having less than or equal to 1% BWOC, less than 0.1% s BWOC, or even less than 0.01% BWOC latex stabilizer. In other aspects, the cement compositions do not include latex stabilizers.

In some aspects, the cement compositions may include additives, such as but not limited to, expansion additives, fluid loss additives, friction reducers, gas block stabilisers, other additives, or combinations of these. In some aspects, the cement compositions may include an expansion additive. The expansion additive can be selected from known expansion additive compounds. Examples of expansion additives may include metal oxides, examples of which include, but are not limited to, calcium oxide (CaO), magnesium oxide (MgO), metal oxides of zinc, magnesium, iron, aluminum powders, or combinations of these. In some aspects, the expansion additive may be a calcined magnesium oxide. In other aspects, the expansion additive may be a mixture of calcium oxide and magnesium oxide. During curing, hydration of magnesium oxide to magnesium hydroxide may provide an expansive force within the cement matrix. Diameters of tubular strings, such as casings and liners, may be affected by changes in temperature and pressure, and therefore, the diameters of such tubular strings may be reduced or expanded, which can lead to the formation of a micro-annulus between the tubular string and the cement or between the cement and the wellbore wall. The expansion additive may be used in the cement compositions to maintain a seal around the tubular string and against the wellbore wall of the wellbore to achieve superior bonding.

The cement compositions may include less than or equal to 10% BWOC expansion additive or less than or equal to 5% BWOC expansion additive. The cement compositions may include from 0.0% BWOC to 10% BWOC, from 0.0% BWOC to 5% BWOC, from 0.1% BWOC to 10% BWOC, from 0.1% BWOC to 5% BWOC, or from 1% BWOC to 10% BWOC expansion additive. In some aspects, the cement compositions may be substantially free of expansion additives, such as less than 1% BWOC, less than 0.1% BWOC, or even less than 0.01% BWOC expansion additive. In some aspects, the cement compositions do not include expansion additives.

In some aspects, the cement compositions may include a fluid loss additive. The fluid loss additive may include non-ionic cellulose derivatives, such as, but not limited to, hydroxyethylcellulose (HEC). Alternatively or additionally, the fluid loss additive may be a non-ionic synthetic polymer, such as but not limited to, polyvinyl alcohol or polyethyleneimine. The fluid loss additive may also include one or more anionic synthetic polymers, such as, but not limited to, 2-acrylamido-2-methylpropane sulfonic acid (AMPS) or AMPS-copolymers, including lattices of AMPS-copolymers. The fluid loss additive may include bentonite. The fluid loss additive may include an acrylamide copolymer, an aliphatic amide polymer, an acrylic polymer, bentonite, latex polymers, gilsonite, additives to latex (for example, styrene-butadiene latex in combination with nonionic and anionic surfactants), octylphenol ethoxylate, polyethylene oxide, copolymers of maleic anhydride, 2-hydroxypropyl acrylate, or combinations of these. The cement compositions may include less than or equal to 5% BWOC, less than or equal to 1% BWOC, or even less than or equal to 0.5% BWOC fluid loss additive. The cement compositions may include from 0.001% BWOC to 5% BWOC, from 0.001% BWOC to 1% BWOC, from 0.001% BWOC to 0.5% BWOC, or from 0.001% BWOC to 0.01% BWOC fluid loss additive. In some aspects, the cement compositions do not include fluid loss additives.

In some aspects, the cement compositions may include a friction reducer. The friction reducer may be a sulfonic acid salt or an aromatic polymer derivative. Other cement friction reducers may include, but are not limited to, polyoxyethylene sulfonate, acetone formaldehyde cyanide resins, polyoxyethylated octylphenol, copolymers of maleic anhydride and 2-hydroxypropyl acrylate, allyloxybenzene sulfonate, allyloxybenzene phosphonate, ferrous sulfate, tannic acid, acetone polycondensate, formaldehyde polycondensate, sulfonated naphthalene formaldehyde condensate, sulfonated indene resins and sulfonated indene-cumarone resins, melamine sulfonate polymers, vinyl sulfonate polymers, styrene sulfonate polymers, polyethyleneimine phosphonate, casein polysaccharides, or combinations of these. The cement compositions may include less than or equal to 10% BWOC friction reducer, such as less than or equal to 5% BWOC, less than or equal to 1% BWOC, or even less than or equal to 0.5% BWOC friction reducer. The cement compositions may include from 0.0% BWOC to 10% BWOC, from 0.0% BWOC to 5% BWOC, from 0.0% BWOC to 1% BWOC, from 0.0% BWOC to 0.5% BWOC, from 0.001% BWOC to 10% BWOC, from 0.001% BWOC to 5% BWOC, from 0.001% BWOC to 1% BWOC, or from 0.001% BWOC to 0.5% BWOC friction reducer. In certain aspects, the cement compositions do not include friction reducers.

In some aspects, the cement compositions may include a gas block stabilizer. Gas block stabilizers may include, but are not limited to, an aminated aromatic salt, an alkyl ether sulfate, an aminated aromatic polymer, or combinations of these. The cement compositions may comprise less than 10 gallons per sack of cement (gps), less than or equal to 5 gps, or even less than or equal to 1 gps gas block stabilizer. The cement compositions may include from 0.0 gps to 10 gps, from 0.0 gps to 5 gps, from 0.0 gps to 1 gps, from 0.1 gps to 10 gps, from 0.1 gps to 5 gps, from 0.1 gps to 1 gps, from 1 gps to 10 gps, or from 1 gps to 5 gps of gas block stabilizer. In some aspects, the cement compositions do not include gas block stabilizers.

The cement compositions of the present disclosure may be prepared by combining the cement precursors, water, and the cement dispersant and mixing the cement composition. Preparing the cement composition may also include combining one or more of silica sand, silica flour, weighting agents, defoamers, cement retarders, surfactants, latex, latex stabilizers, or combinations of these, with the cement precursor and water before or during mixing. Preparing the cement composition may further include adding one or a plurality of optional additives, such as but not limited to expansion additives, friction reducers, fluid loss additives, gas block stabilizers, other additives, or combinations of these, to the cement composition before or after mixing. The cement composition may be mixed for a period of time sufficient to produce a homogeneous mixture. In embodiments, the cement composition may be mixed for a period of from 10 minutes to 50 minutes, from 10 minutes to 40 minutes, from 10 minutes to 30 minutes, from 10 minutes to 20 minutes, from 15 minutes to 50 minutes, from 15 minutes to 40 minutes, from 15 minutes to 30 minutes, from 15 minutes to 20 minutes, from 20 minutes to 50 minutes, from 20 minutes to 40 minutes, from 20 minutes to 30 minutes, or about 30 minutes.

In some aspects, the cement composition of the present disclosure may include from 10 wt. % to 70 wt. % cement precursor based on the total weight of the cement composition, from 5 wt. % to 70 wt. % water based on the total weight of the cement composition, and from 0.001 percent BWOC to 1 percent BWOC cement dispersant, where the cement dispersant comprises a polynaphthalene sulfonate salt, such as but not limited to a polynaphthalene sodium salt. The cement precursor may be an API class G cement. The cement precursor may include from 75 wt. % to 85 wt. % silicates based on the total weight of the cement precursor. In some aspects, the cement precursor may include from 60 wt. % to 65 wt. % tricalcium silicate based on the total weight of the cement precursor. In embodiments, the cement precursor may include from 1 wt. % to 20 wt. % dicalcium silicate based on the total weight of the cement precursor.

The cement composition may include from greater than 0% BWOC to 20% BWOC silica sand, from 5% BWOC to 10% BWOC silica flour. The cement composition may include from 0% to 10% BWOC to 150% BWOC weighting agent. The cement composition may include from about 0 to about 10% BWOC cement retarder. The cement composition may further include from greater than 0% BWOC to less than or equal to 10% BWOC expansion additive, from greater than 0% BWOC to less than or equal to 5% BWOC defoamer, from greater than 0% BWOC to less than or equal to 10% BWOC latex, and from greater than 0% BWOC to less than or equal to 10% BWOC latex stabilizer. Any of the other additives previously discussed in the present disclosure may also be incorporated into the cement compositions.

The cement compositions of the present disclosure can be prepared with different density, viscosity, and mechanical properties by changing the concentrations of one or more constituents of the cement composition. Thus, the cement compositions may be adapted for use in different downhole conditions of the wellbore. The cement compositions of the present application may be adjusted to modify the rheology, density, and compressive strength of the cement composition, which may reduce or prevent the well integrity from being compromised during the well's lifetime.

The cement compositions may have a density of from 65 pounds per cubic foot (pcf) to 180 pcf (1041 kilograms per cubic meter (kg/m$^3$) to 2883 kg/m$^3$; where 1 pcf is equal to 16.02 kg/m$^3$). In embodiments, the cement compositions may have a density of from 65 pcf to 160 pcf, from 65 pcf to 140 pcf, from 65 pcf to 125 pcf, from 120 pcf to 180 pcf, from 120 pcf to 160 pcf, from 120 pcf to 140 pcf, from 125 pcf to 180 pcf, from 125 pcf to 160 pcf, from 125 pcf to 140 pcf, from 140 pcf to 180 pcf, from 140 pcf to 160 pcf, or from 160 pcf to 180 pcf.

The cement compositions may have a Bearden consistency (BC) of from 50 to 100 BC when measured using a high temperature high pressure (HTHP) consistometer according to the test methods provided subsequently in this disclosure. In measuring the Bearden consistency, the temperature of the cement composition may be increased to a temperature of 150° F. (65° C.) to simulate a bottom hole circulating temperature (BHCT) of 150° F. (65° C.), and the pressure of cement composition may be ramped up to a final pressure of 5200 pounds per square inch (psi) (36 MPa). The cement compositions may have a BC of from 50 BC to 90 BC, from 50 BC to 80 BC, from 50 BC to 70 BC, from 60 BC to 100 BC, from 60 BC to 90 BC, from 60 BC to 80 BC, from 60 BC to 70 BC, from 70 BC to 100 BC, from 70 BC to 90 BC, from 70 BC to 80 BC, from 80 BC to 100 BC, from 80 BC to 90 BC, or from 90 BC to 100 BC when measured using the HTHP consistometer according to the test methods provided subsequently in this disclosure.

Before introducing the cement composition to the wellbore or annulus and before any substantial curing of the cement has taken place (such as within less than 20 minutes after preparing the cement composition), the cement composition may have a plastic viscosity (PV) of from 1 centipoise (cP) to 200 cP when measured at a temperature from 70° F. to 300° F. (21° C. to 150° C.) according to the test methods provided subsequently in this disclosure. The cement composition may have a PV of from 1 cP to 220 cP, from 1 cP to 200 cP, from 1 cP to 150 cP, from 10 cP to 220 cP, from 10 cP to 200 cP, from 10 cP to 150 cP, from 20 cP to 220 cP, from 20 cP to 200 cP, or from 20 cP to 150 cP, from 100 cP to 220 cP, from 100 cP to 200 cP, from 100 cP to 150 cP, from 125 cP to 220 cP, from 125 cP to 200 cP, or from 125 cP to 175 cP when measured at temperatures from 70° F. to 300° F. (21° C. to 149° C.), according to the test methods provided subsequently in this disclosure. In aspects, the cement composition may have a PV of from 125 cP to 162 cP when measured at temperatures from 70° F. to 300° F. (21° C. to 149° C.), according to the test methods provided subsequently in this disclosure.

Before introducing the cement composition to the wellbore or annulus and before any substantial curing has taken place (such as within less than 20 minutes after preparing the cement composition), the cement composition may have a yield point (YP) of from 5 to 200 lb$_f$/100 ft$^2$ when measured at about 70° F. to about 300° F. (about 21° C. to about 149° C.) according to the test methods provided subsequently in this disclosure. In embodiments, the cement composition may have a YP of from 5 lb$_f$/100 ft$^2$ to 150 lb$_f$/100 ft$^2$, from 5 lb$_f$/100 ft$^2$ to 100 lb$_f$/100 ft$^2$, from 5 lb$_f$/100 ft$^2$ to 75 lb$_f$/100 ft$^2$, from 10 lb/100 ft$^2$ to 200 lb$_f$/100 ft$^2$, from 10 lb$_f$/100 ft$^2$ to 150 lb$_f$/100 ft$^2$, from 10 lb$_f$/100 ft$^2$ to 100 lb$_f$/100 ft$^2$, from 10 lb$_f$/100 ft$^2$ to 75 lb$_f$/100 ft$^2$, from 5 lb$_f$/100 ft$^2$ to 30 lb$_f$/100 ft$^2$, from 5 lb$_f$/100 ft$^2$ to 25 lb$_f$/100 ft$^2$, or from 5 lb$_f$/100 ft$^2$ to 20 lb$_f$/100 ft$^2$ when measured at about 70° F. to about 300° F. (about 21° C. to about 149° C.) according to the test methods provided subsequently in this disclosure.

The cement composition may have a gel strength before curing that enables the cement composition to suspend the weighting materials and other solids added to increase the density of the cement composition while maintaining the pump-ability of the cement composition to prevent stuck-pipe problems. The cement compositions may have a 10-second gel strength of from 1.0 pound of force per square foot (lb$_f$/100 ft$^2$) to 30 lb$_f$/100 ft$^2$, from 1 lb$_f$/100 ft$^2$ to 25 lb$_f$/100 ft$^2$, from 1 lb$_f$/100 ft$^2$ to 20 lb$_f$/100 ft$^2$, from 5 lb$_f$/100 ft$^2$ to 30 lb$_f$/100 ft$^2$, from 5 lb$_f$/100 ft$^2$ to 25 lb$_f$/100 ft$^2$, from 5 lb$_f$/100 ft$^2$ to 20 lb$_f$/100 ft$^2$, from 10 lb$_f$/100 ft$^2$ to 30 lb$_f$/100 ft$^2$, from 10 lb$_f$/100 ft$^2$ to 25 lb$_f$/100 ft$^2$, or from 10 lb$_f$/100 ft$^2$ to 20 lb$_f$/100 ft$^2$ measured immediately after preparation of the cement composition and before substantial curing has taken place, such as within 20 minutes of preparing the cement composition. The cement compositions may have a 10-minute gel strength of from 1 lb$_f$/100 ft$^2$ to 60 lb$_f$/100 ft$^2$, from 1 lb$_f$/100 ft$^2$ to 55 lb$_f$/100 ft$^2$, from 1 lb$_f$/100 ft$^2$ to 50 lb$_f$/100 ft$^2$, from 10 lb$_f$/100 ft$^2$ to 60 lb$_f$/100 ft$^2$, from 10 lb$_f$/100 ft$^2$ to 55 lb$_f$/100 ft$^2$, from 10 lb$_f$/100 ft$^2$ to 50 lb$_f$/100 ft$^2$, from 20 lb$_f$/100 ft$^2$ to 60 lb$_f$/100 ft$^2$, from 20 lb$_f$/100 ft$^2$ to 55 lb$_f$/100 ft$^2$, from 20 lb$_f$/100 ft$^2$ to 50 lb$_f$/100 ft$^2$, from 30 lb$_f$/100 ft$^2$ to 60 lb$_f$/100 ft$^2$, from 30 lb$_f$/100 ft$^2$ to 55 lb$_f$/100 ft$^2$, from 30 lb$_f$/100 ft$^2$ to 50 lb$_f$/100 ft$^2$, from 40 lb$_f$/100 ft$^2$ to 60 lb$_f$/100 ft$^2$, or from 40 lb$_f$/100 ft$^2$ to 55 lb$_f$/100 ft$^2$ when measured immediately after preparation of the cement composition and before substantial curing has taken place, such as within 20 minutes of preparing the cement composition. The 10-second gel strength and 10-minute gel strength of the cement compositions may be determined according to the test methods subsequently described in this disclosure.

Before any substantial curing has taken place (such as within less than 20 minutes after preparing the cement composition), the cement composition may have a fluid loss of from 0 to 400 cubic centimeters per 30 minutes (cm$^3$/30 min) measured according to the test methods provided subsequently in this disclosure. In embodiments, prior to curing the cement composition, the free fluid of the cement composition may be less than or equal to 10%, less than or equal to 5%, less than or equal to 3%, less than or equal to 2%, less than or equal to 1%, or even less than or equal to 0.1% measured according to the test methods provided subsequently in this disclosure. In embodiments, prior to curing the cement compositions, the free fluid of the cement compositions is about 0%.

The cement compositions of the present disclosure may have a thickening time of greater than or equal to 4 hours according to the test methods provided subsequently in this disclosure. In embodiments, the cement compositions may have a thickening time of from 4 hours to 48 hours, from 4 hours to 24 hours, from 4 hours to 12 hours, or from 4 hours to 8 hours. The cement compositions of the present disclosure may have a cure time of from 4 hours to 48 hours according to the test methods provided subsequently in this disclosure. In some aspects, the cement compositions may have a cure time of from 0.5 hours to 12 hours, from 0.5 hours to 8 hours, from 0.5 hours to 6 hours, from 0.5 hours to 4 hours, from 0.5 hours to 3 hours, from 1 hour to 24 hours, from 1 hour to 12 hours, from 1 hour to 8 hours, from 1 hours to 6 hours, from 1 hours to 4 hours, from 1 hour to 3 hours, from 2 hours to 24 hours, from 2 hours to 12 hours, from 2 hours to 8 hours, from 2 hours to 6 hours, or from 2 hours to 4 hours.

As previously discussed, some aspects of the present disclosure are directed to methods for cementing a tubular string in a wellbore by dispensing the cement composition of the present disclosure into an annulus of the wellbore (wellbore annulus 22, casing-casing annulus 32, or both in FIG. 1) and allowing the cement composition to cure in the annulus to form a cured cement. The cement composition may include a cement precursor, water, and the cement dispersant of the present disclosure, where the cement dispersant is a polynaphthalene sulfonate salt, such as a polynaphthalene sulfonate sodium salt.

Referring again to FIG. 1, the methods for cementing wellbores 10, may include dispensing the cement composition into the wellbore annulus 22 defined between the tubular string 20 and the wellbore wall 16 of the wellbore 10, between two tubular strings 20 positioned in the wellbore 10, or both. The cement composition may include a cement precursor, water, and the cement dispersant as described herein. The cement precursor, water, and the cement dispersant may have any of the features, compositions, or characteristics subsequently described for these constituents of the cement composition. The cement composition may include any of the other constituents described in the present disclosure. The method may further include allowing the cement composition to cure in the annulus (wellbore annulus 22, casing-casing annulus 32, or both) to form a cured cement. The methods may further include preparing the cement composition. The methods may include preparing the cement dispersant. The method may further include mixing the cement composition to obtain a homogeneous mixture.

Prior to preparing the cement composition and dispensing the cement composition into the annulus 22, 32, the method may include drilling the wellbore 10, placing the tubular string 20 in the wellbore 10, or both. Dispensing the cement composition into the annulus 22, 32 may include dispensing (such as by pumping) the cement composition into the fluid conduit 18 defined by an interior surface 26 of the tubular string 20, wellbore wall 16, or both and dispensing a displacement fluid into the fluid conduit 18 after the cement composition such that the displacement fluid displaces the cement composition from the fluid conduit 18 into the annulus, such as the wellbore annulus 22, casing-casing annulus 32, or both. The displacement fluid may be pumped into the fluid conduit 18 of the tubular string 20 downhole from an uphole plug (not shown) to force the cement composition to the downhole end of the tubular string 20, around the downhole edge of the tubular string 20, and into the annulus 22, 32. A displacement fluid may also be referred to as a flush fluid. The displacement fluid may be pumped into the fluid conduit 18 of the tubular string 20 until all of the cement composition is disposed within the annulus 22, 32. Cooperation of a downhole plug and the uphole plug may operate to maintain the cement composition in the annulus 22, 32. As identified herein, the cement dispersant of the present disclosure provides for improved rheological properties to the cement. It is therefore an aspect of the present disclosure that the cement compositions are easier to pump due to the cement dispersants as described herein. In aspects, the cement dispersants allow for reduced viscosity of the cement composition. In aspects, the cement dispersants reduce friction loss during dispensing of the cement compositions.

In aspects, the cement compositions may include one or more constituents that may be at least partially incompatible with drilling fluids or other treatment fluids present in the wellbore 10 when installing the tubular strings 20. When the cement composition includes constituents incompatible with drilling or treatment fluids already present in the wellbore 10, the method may further include dispensing a spacer fluid into the fluid conduit 18, the wellbore 10, or both, before dispensing the cement composition into the wellbore 10. The spacer fluid may provide a buffer between the drilling fluid or treatment fluid and the cement composition to prevent contact between incompatible constituents. Various washing fluids or pre-flush fluids may also be introduced to the interior volume of the tubular string 20 before or after the spacer fluid. Washing fluids may be used to remove films and residue from the surfaces of the tubular string 20 and wellbore wall. A fixed amount of the cement composition may then be pumped into the internal volume of the tubular string 20 after the spacer fluid. The fixed amount of the cement composition may be an amount that fills the annulus, such as the wellbore annulus 22, casing-casing annulus 32, or both. A downhole plug may be used between the spacer fluid and cement composition, and an uphole plug may be inserted after the cement composition.

The cement compositions may be used for sealing the annulus or remediating a wellbore 10 under a range of different downhole conditions in the wellbore. The cement compositions may be adapted to different downhole conditions by changing the concentrations of the cement retarder, weighting materials, or other additives in the cement composition to modify the specific gravity, viscosity, mechanical properties, curing time, or other properties of the cement composition.

The cement composition may then be allowed to cure to form a barrier between the tubular string 20 and the wellbore 10, between the tubular string 20 and an outer tubular string 20, or both. When the cement composition cures, the cement composition may physically and chemically bond with both the exterior surface 24 of the tubular string 20 and the wellbore wall 16 or interior surface 26 of the outer casing surrounding the tubular string 20, coupling the tubular string 20 to the wellbore wall 16 or the outer casing. This fluid isolation does not permit fluid migration through the cement composition to the interior of the well or up-hole to the surface 12.

In addition to primary sealing, remedial sealing may be performed using the cement compositions of the present disclosure. In remedial sealing, the cement composition may be introduced to specific locations within the wellbore 10 to repair the wellbore 10, such as to repair sections of the wellbore in which micro-cracks have formed in the annuli or in which increased casing-casing annulus pressure has caused damage to the tubular strings 20. Remedial sealing may also include injecting the cement composition into the wellbore 10 for purposes of sealing the wellbore 10 in preparation for abandonment or for controlling water production from the subterranean formation. In some situations, remedial sealing may include the process of "squeezing," in which the cement composition is forced against the inner surface of the portion of the well to be remediated, such as the inner surface of the innermost tubular string. As the cement composition is forced against the inner surface of the tubular string or wellbore wall, liquid portions of the cement composition may be "squeezed" into the microcracks, or into the formation in the case of remediating the wellbore wall.

Test Methods

Viscosity

The viscosity of the cement compositions may be measured using a standard oilfield viscometer, such as a FANN® Model 35 viscometer manufactured by Fann Instrument Company for example, according to test methods provided in the API Recommended Practice For Cementing (RP 10B). The viscosity is reported as shear stress in units of pounds of force per 100 square feet ($lb_f/100\ ft^2$). The viscometer may also be used to measure the shear rate of the cement compositions.

Gel Strength

The gel strength refers to the shear stress of the cement composition measured at a reduced shear rate following a defined period of time during which the cement composition is maintained in a static state. The shear stress of the composition at reduced shear rate may be measured using a standard oilfield viscometer, such as a FANN® Model 35 viscometer operated at reduced rotations per minute ("rpms"), such as at 3 rpm, according to the test methods described in API Recommended Practice On Determining the Static Gel Strength of Cement Formulations (RP 10B-6/ISO 10426-6:2008). To measure the gel strength, the cement composition is first stirred by contacting the composition with the spindle of the viscometer and operating the viscometer at 600 rotations per minute (rpm). The viscometer is then turned off for period of time (time period). For a 10-second gel strength the time period is 10 seconds, and for a 10-minute gel strength the time period is 10 minutes. It should be understood that other time periods for measuring gel strength may be used as reference times for measurements of gel strength. During the time period, the composition comes to rest in a static state. Upon expiration of the time period, the viscometer is turned back on at a reduced speed, such as 3 rpm for example, to generate a reduced shear rate. The viscometer reading is then taken. The gel strength of the cement composition is reported in units of pounds of force per 100 square feet ($lb_f/100\ ft^2$).

Rheology

The rheology of the cement compositions may be modeled based on Bingham plastic flow behavior. In particular, the cement compositions may behave as a rigid body at lesser shear stress but flow as a viscous fluid at greater shear stress. The rheological behavior of the cement compositions may be determined by measuring the shear stress on the composition at different shear rates, which may be accomplished by measuring the shear stress, the shear rate, or both on the composition using a FANN® Model 35 viscometer operated at 3 rpm, 6 rpm, 100 rpm, 200 rpm, 300 rpm, or 600 rpm, for example. The rheology of the cement compositions may be evaluated from the plastic viscosity (PV) and the yield point (YP), which are parameters from the Bingham plastic rheology model. The PV is related to the resistance of the composition to flow due to mechanical interaction between the solids of the composition and represents the viscosity of the composition extrapolated to infinite shear rate. The PV reflects the type and concentration of the solids, such as weighting materials, in the cement compositions, and a lesser PV is preferred. The PV of the cement compositions may be estimated by measuring the shear stress of the composition using a FANN® Model 35 viscometer at spindle speeds of 300 rotations per minute (rpm) and 600 rpm and subtracting the 300 rpm viscosity measurement from the 600 rpm viscosity measurement according to Equation 2 (EQU. 2), which is subsequently provided. The PV values determined for the cement compositions are provided in this disclosure in units of centipoise (cP).

$$PV=(\text{viscosity at 600 rpm})-(\text{viscosity at 300 rpm}) \qquad \text{EQU. 2}$$

At shear stress less than the YP of the cement composition, the cement composition behaves as a rigid body, and at shear stress greater than the YP of the cement composition, the cement composition flows as a viscous fluid. In other words, the YP represents the amount of stress required to move a fluid from a static condition. The YP is determined by extrapolating the Bingham plastic rheology model to a shear rate of zero. The YP of the cement composition may be estimated from the PV from EQU. 2 by subtracting the PV from the shear stress measured at 300 rpm according to Equation 3 (EQU. 3), which is provided subsequently.

$$YP=(300\ \text{rpm reading})-PV \qquad \text{EQU. 3}$$

The YP is expressed as a force per area, such as pounds of force per one hundred square feet ($lb_f/100\ ft^2$) for example. The methods for measuring and determining PV and YP for the cement compositions are consistent with methods conventionally used for drilling fluids in general.

Fluid Loss Test

API fluid loss is a test that measures the static filtration behavior of the cement slurry at ambient temperature and 100-psi differential pressure. The fluid loss of the cement compositions may be measured according to test methods provided in the API Recommended Practice For Cementing (RP 10B).

Free Fluid API Test

Free fluid, which is also known as "free water," is the percent volume of fluid that separates from a cement slurry when the slurry is left static. The free fluid can be measured according to test methods provided in the API Recommended Practice For Cementing (RP 10B).

Thickening Time Test

Thickening time is a measurement of the time a cement slurry remains in a fluid state and is capable of being pumped. To assess thickening time, downhole conditions are simulated by plotting the consistency of the slurry over time at the anticipated temperature and pressure conditions. The consistency of the slurry is measured in Bearden Consistency units (Bc), which are a dimensionless quantity on a scale from 1 to 100. At levels greater than 50 Bc, pumping begins to become difficult, and at 100 Bc, the cement slurry is completely set.

EXAMPLES

The following examples illustrate one or more features of the present disclosure. It should be understood that these examples are not intended to limit the scope of the disclosure or the appended claims in any manner. In these Examples and Comparative Examples, Table 2 provides the composition for class G cement utilized as the cement precursor in the cement compositions in these Examples and cement compositions of the Comparative Examples.

TABLE 2

| Composition of Class G Cement | |
|---|---|
| Constituent | Mass % |
| Silica ($SiO_2$) | ≤21.7 |
| Alumina ($Al_2O_3$) | ≤3.2 |
| Iron Oxide ($Fe_2O_3$) | ≤3.7 |
| Calcium Oxide, Total (TCaO) | ≤62.9 |
| Magnesium Oxide (MgO) | ≤6.0 |
| Sulphur Trioxide ($SO_3$) | ≤3.0 |
| Loss on Ignition | 0.74-3.0 |
| Equivalent Alkali (as $Na_2O$) | 0.54-0.75 |
| Insoluble Residue | 0.14-0.75 |
| Tricalcium silicate $C_3S$ | 48-65 |
| Tricalcium aluminate $C_3A$ | 1-10 |
| Dicalcium silicate $C_2S$ | 1-20 |
| Tetracalcium aluminoferrite $C_4AF$ | 1-15 |

Example 1: Preparation and Analysis of the Cement Dispersant

In Example 1, a cement dispersant comprising a polymer composition of polynaphthalene sulfonates (or polynaphthalene sulfonic acid) was obtained by conducting a condensation reaction with sodium naphthalene sulfonate and formaldehyde for use as a potential dispersant. At the desired degree of polymerization, the condensation reaction was neutralized with caustic soda. The resulting composition was of about 92 to 95% polymer salt (with sodium) and about 5-8% water. The composition is shown in FIG. 3 by $^1$H-NMR (nuclear magnetic resonance) and FT-IR (Fourier transform infrared), with the NMR and IR (infrared) spectroscopy results shown in detail and in comparison to the commercially available CFR-3 dispersant.

Using aqueous gel permeation chromatography (GPC), the molar mass distribution of the polymer dispersant was determined. The number average molecular weight (Mn), the weight average molecular weight (Mw) and polydispersity index values of the submitted polymer sample were determined to be 2760 g/mol, 2774 g/mol and 1.0, respectively.

Twelve PEG/PEO calibration standards with the following peak average molecular weights (Mp) 106, 194, 610, 1480, 3870, 16100, 30310, 71800, 134300, and 552000, 863500, and 1522000 g/mol were used for the columns' calibration. The calibration standard solutions were prepared with the GPC mobile phase and were allowed to stand for 2 hours to achieve a complete dissolution of the polymers. The polymer sample (25 mg/mL) was dissolved in the GPC mobile phase. GPC conditions are presented in Table 3. Using PSS WinGPC data analysis tool, a calibration plot was obtained from the twelve PEG/PEO standards. The $M_n$, $M_w$, and PDI from the calibration plot were calculated. The $M_n$, $M_w$, and PDI are determined to be 2760 g/mol, 2774 g/mol and 1.0, respectively.

TABLE 3

| GPC Conditions | |
|---|---|
| Flow Rate | 0.8 mL/min |
| Detector | Refractive Index Detector |
| Injection Volume | 25 μL |
| Run Time | 30 min. |
| Mobile Phase | 0.01M $Na_2HPO_4$ in 0.05M $NaNO_3$ |
| Columns | PL aquagel-OH 30 and PL aquagel-OH 20 |
| Column Oven Temperature | 35° C. |

Example 2. Cement Slurry and Rheology Tests

In Example 2, four cement compositions comprising the cement dispersant of Example 1 were prepared and the rheology of the cement compositions evaluated. The cement compositions for each test are presented in Table 4. The cement compositions of Example 2 included the Saudi Class G cement from Table 2 as the cement precursor. Each cement composition included a fluid loss additive at a concentration of 0.7% BWOC. The water for each cement composition was fresh water having a tested density of 1 g/cm$^3$, a salinity of 250 ppm, a hardness of 50, and a pH of 7.

TABLE 4

| | Test 1 | Test 2 | Test 3 | Test 4 |
|---|---|---|---|---|
| Defoamer | 0.005% BWOC | 0.005% BWOC | 0.005% BWOC | 0.005% BWOC |
| Dispersant | 0.1% BWOC | 0.1% BWOC | 0.3% BWOC | 0.4% BWOC |
| Retarder | 0.1% BWOC | 0.1% BWOC | 0.1 5BWOC | 0.1% BWOC |
| Fluid Loss Additive | 0.7% BWOC | 0.7% BWOC | 0.7% BWOC | 0.7% BWOC |
| Mix Water (gps) | 5.102 | 5.102 | 5.091 | 5.085 |
| Mix Fluid (gps) | 5.180 | 5.180 | 5.186 | 5.189 |

The mix fluid included the defoamer (DF-3, Halliburton), retarder (LTR, Halliburton), fluid loss additive (CFL-4, Halliburton), and the dispersant. The slurry characteristics for each of the cement compositions of Example 2 are presented in Table 5:

TABLE 5

| Slurry Characteristics | | | | |
|---|---|---|---|---|
| | Test 1 | Test 2 | Test 3 | Test 4 |
| Type | 0 | 0 | 0 | 0 |
| Density (pcf) | 118 | 118 | 118 | 118 |
| Yield (ft$^3$/sk) | 1.16 | 1.16 | 1.17 | 1.17 |
| SVF % | 41.6 | 41.6 | 41.8 | 41.9 |

The SVF (solid volume fraction) refers to the proportion of solid material in the slurry by volume, and Yield refers to the volume of the cement slurry produced per sack of cement precursor. For each of the cement compositions of Example 2, rheology data was obtained at both room temperature (RT) and at 150° F. with a FANN-Viscometer. The data of each test is set forth in Tables 6A, 6B, 6C, and 6D):

TABLE 6A

| | Test 1 | | | | | |
|---|---|---|---|---|---|---|
| | RT | | | 150° F. | | |
| Speed (rpm) | Up | Down | Avg | Up | Down | Avg |
| 300 | 169 | 169 | 169 | 231 | 231 | 231 |
| 200 | 122 | 123 | 122.5 | 175 | 171 | 173 |
| 100 | 72 | 71 | 71.5 | 117 | 109 | 113 |
| 60 | 48 | 49 | 48.5 | 93 | 82 | 87.5 |
| 30 | 27 | 29 | 28 | 62 | 52 | 57 |
| 6 | 10 | 11 | 10.5 | 16 | 10 | 13 |
| 3 | 8 | 9 | 8.5 | 14 | 9 | 11.5 |

TABLE 6B

| | Test 2 | | | | | |
|---|---|---|---|---|---|---|
| | RT | | | 150° F. | | |
| Speed (rpm) | Up | Down | Avg | Up | Down | Avg |
| 300 | 169 | 169 | 169 | 231 | 231 | 231 |
| 200 | 122 | 123 | 122.5 | 175 | 171 | 173 |
| 100 | 72 | 71 | 71.5 | 117 | 109 | 113 |
| 60 | 48 | 49 | 48.5 | 93 | 82 | 87.5 |
| 30 | 27 | 29 | 28 | 62 | 52 | 57 |
| 6 | 10 | 11 | 10.5 | 16 | 10 | 13 |
| 3 | 8 | 9 | 8.5 | 14 | 9 | 11.5 |

TABLE 6C

| | Test 3 | | | | | |
|---|---|---|---|---|---|---|
| | RT | | | 150° F. | | |
| Speed (rpm) | Up | Down | Avg | Up | Down | Avg |
| 300 | 138 | 138 | 138 | 155 | 155 | 155 |
| 200 | 100 | 99 | 99.5 | 107 | 113 | 110 |
| 100 | 52 | 51 | 51.5 | 64 | 66 | 65 |
| 60 | 32 | 30 | 31 | 46 | 44 | 45 |
| 30 | 23 | 20 | 21.5 | 27 | 25 | 26 |
| 6 | 8 | 7 | 7.5 | 10 | 9 | 9.5 |
| 3 | 6 | 5 | 5.5 | 7 | 6 | 6.5 |

TABLE 6D

| | Test 4 | | | | | |
|---|---|---|---|---|---|---|
| | RT | | | 150° F. | | |
| Speed (rpm) | Up | Down | Avg | Up | Down | Avg |
| 300 | 128 | 128 | 128 | 132 | 132 | 132 |
| 200 | 95 | 96 | 95.5 | 99 | 99 | 99 |
| 100 | 49 | 48 | 48.5 | 61 | 60 | 60.5 |
| 60 | 29 | 29 | 29 | 40 | 41 | 40.5 |
| 30 | 19 | 19 | 19 | 22 | 21 | 21.5 |
| 6 | 8 | 7 | 7.5 | 9 | 8 | 8.5 |
| 3 | 6 | 5 | 5.5 | 6 | 6 | 6 |

The cement properties of 10 second gel strength, 10 minute gel strength, plastic viscosity and yield point were assessed, with the resulting values set forth in Table 7. As the amount of cement dispersant increased in the cement compositions, the plastic viscosity decreased.

TABLE 7

| | Room Temperature | | | | 150° F. | | | |
|---|---|---|---|---|---|---|---|---|
| | Test 1 | Test 2 | Test 3 | Test 4 | Test 1 | Test 2 | Test 3 | Test 4 |
| 10 second gel strength (lbf/100 ft$^2$) | 9 | 9 | 5 | 5 | 8 | 8 | 6 | 5 |
| 10 minute gel strength (lbf/100 ft$^2$) | 16 | 16 | 12 | 10 | 13 | 13 | 16 | 15 |
| PV (cP) | 161.6 | 161.6 | 134.5 | 125.9 | 215.1 | 215.1 | 147.7 | 127.4 |
| YP (lb/100 ft$^2$) | 12.3 | 12.3 | 6.1 | 5.9 | 27.9 | 27.9 | 10.9 | 10.7 |

Example 3. Cement Comparison with Different Cement Dispersants

For Example 3, a cement composition comprising the cement dispersant of Example 1 was prepared. The materials and formulation for the cement composition of Example 3 are provided below in Table 8. The cement composition of Example 3 had a density of 140 pcf.

TABLE 8

| Material | Weight (g) |
|---|---|
| Silica Sand (SSA-2) | 219.525 |
| Expansion Additive (microbond HT) | 6.272 |
| Weighting Agent (hematite) | 219.525 |
| Defoamer (D-Air 3000 L) | Few drops |
| Gelling Agent WG-17 | 0.314 |
| Dispersant (CFR-3/ Polynaphthalene sulfonate) | 3.136 |
| Retarder (HR-5) | 3.763 |
| Drill Water | 265.037 |
| Class G Cement | 627.213 |
| | ~1344.785 (total) |

Comparative Example 4: Cement Composition with Comparative Commercially Available Cement Dispersant In Comparative Example 4, a cement composition was prepared with a comparative commercially available cement dispersant, which was CFR-3 dispersant from Halliburton. The materials and formulation for the cement composition of Comparative Example 4 are the same as those in Table 7, except for the cement dispersant. The cement composition of Comparative Example 4 also had a density of 140 pcf.

Example 5: Comparison of Rheological Properties of Example 3 and Comparative Example 4

In Example 5, the rheological properties of the cement compositions of Example 3 and Comparative Example 4 were evaluated and compared. The rheology results for the cement composition of Comparative Example 4 comprising the comparative commercially available dispersant are presented in Table 9, and the rheology results for the cement composition of Example 3 made with the cement dispersant comprising the polynaphthalene sulfonate are presented in Table 10:

TABLE 9

|  | Down | Up |  |
| --- | --- | --- | --- |
| 300: | 260 | 8 | 3: |
| 200: | 171 | 11 | 6: |
| 100: | 90 | 87 | 100: |
| 6: | 10 | 190 | 200: |
| 3: | 8 | 279 | 300: |

TABLE 10

|  | Down | Up |  |
| --- | --- | --- | --- |
| 300: | 257 | 17 | 3: |
| 200: | 191 | 21 | 6: |
| 100: | 124 | 124 | 100: |
| 6: | 34 | 187 | 200: |
| 3: | 25 | 257 | 300: |

The test result of the prepared polymer dispersant shows an excellent dispersing effect compared to the reference as well as a compatibility with different cement additives.

A first aspect of the present disclosure, either alone or in combination with any other aspect, concerns a cement composition comprising: from 10 weight percent to 70 weight percent cement precursor based on the total weight of the cement composition; from 5 weight percent to 70 weight percent water based on the total weight of the cement composition; and from 0.001 percent by weight of cement (BWOC) to 1.0 percent BWOC cement dispersant, where the cement dispersant comprises a polynaphthalene sulfonate salt having a weight average molecular weight of from 2500 g/mol to 3000 g/mol.

A second aspect of the present disclosure, either alone or in combination with any other aspect, concerns the cement composition of the first aspect, where the polynaphthalene sulfonate salt has a weight average molecular weight of from 2700 g/mol to 2800 g/mol.

A third aspect of the present disclosure may include either one of the first or second aspects, wherein the polynaphthalene sulfonate salt has a weight average molecular weight of 2774 g/mol.

A fourth aspect of the present disclosure may include any one of the first through third aspects, wherein the polynaphthalene sulfonate salt comprises one or more cations selected from the group consisting of sodium, lithium, potassium, ammonium, and combinations of these.

A fifth aspect of the present disclosure may include any one of the first through fourth aspects, wherein the polynaphthalene sulfonate salt is sodium polynaphthalene sulfonate.

A sixth aspect of the present disclosure may include any one of the first through fifth aspects, wherein the cement dispersant further comprises formaldehyde, acetone, or both.

A seventh aspect of the present disclosure may include any one of the first through sixth aspects, wherein the cement dispersant comprises from 92 weight percent to 95 weight percent polynaphthalene sulfonates based on the total weight of the cement dispersant.

An eighth aspect of the present disclosure may include any one of the first through seventh aspects, wherein the cement dispersant comprises from 5 weight percent (wt. %) to 8 wt. % water based on the total weight of the cement dispersant.

A ninth aspect of the present disclosure may include any one of the first through eighth aspects, where the cement precursor is an American Petroleum Institute (API) Class G cement.

A tenth aspect of the present disclosure may include any one of the first through ninth aspects, further comprising a weighting agent selected from sand, barite (barium sulfate), hematite, calcium carbonate, siderite, ilmenite, silica sand, manganese oxide (MnO), hausmanite (manganese tetroxide ($Mn_3O_4$)), zinc oxide, zirconium oxide, iron oxide, fly ash, or any combination thereof.

An eleventh aspect of the present disclosure may include any one of the first through tenth aspects, further comprising at least one additive selected from the group consisting of an expansion additive, a silica sand, a cement retarder, a defoamer, a gelling agent, and combinations of these.

A twelfth aspect of the present disclosure may include any one of the first through eleventh aspects, further comprising: from greater than 0 percent BWOC to less than or equal to 10 percent BWOC of an expansion additive; from greater than 0 percent BWOC to less than or equal to 20 percent BWOC silica sand; from greater than 0 percent BWOC to less than or equal to 5 percent BWOC defoamer; and from greater than 0 percent BWOC to less than or equal to 10 percent BWOC gelling agent.

A thirteenth aspect of the present disclosure may include any one of the first through twelfth aspects, further comprising about 16% BWOC silica sand, about 0.005% BWOC expansion additive, about 16% BWOC weighting additive; 0.0001% BWOC defoamer; 0.003% BWOC cement retarder and about 20% BWOC water.

A fourteenth aspect of the present disclosure may include any one of the first through thirteenth aspects, where the cement composition has a plastic viscosity (PV) of from 1 centepoise (cP) to 200 cP at room temperature prior to curing of the cement composition.

A fifteenth aspect of the present disclosure may include any one of the first through fourteenth aspects, where the cement composition has a 10 second gel strength greater than or equal to 4 pounds of force per 100 square feet ($lb_f/100$ $ft^2$), as determined according to the method in the API Recommended Practice for Cementing.

A sixteenth aspect of the present disclosure may include any one of the first through fifteenth aspects, where the cement composition has a yield point (YP) of from 5.5 pounds of force per 100 square feet ($lb_f/100$ $ft^2$) to 17.5 $lb_f/100$ $ft^2$ at room temperature within 20 minutes of preparing the cement composition.

A seventeenth aspect of the present disclosure may include any one of the first through sixteenth aspects, wherein the cement dispersant does not include polyvinylpyrolidone.

An eighteenth aspect of the present disclosure may include any one of the first through seventeenth aspects, wherein the cement dispersant consists of polynaphthalene sulfonate salt, water, acetone and formaldehyde.

A nineteenth aspect of the present disclosure may include any one of the first through eighteenth aspects, wherein adding the cement dispersant decreases the PV and improves rheology of the cement composition.

A twentieth aspect of the present disclosure may be directed to a method for cementing a wellbore. The method may comprise dispensing a cement composition into an annulus defined between a tubular string and an inner wall of a wellbore or between two tubular strings, where the cement composition comprises the cement composition of any one of the first through nineteenth aspects. The method may further include allowing the cement composition to cure in the annulus to form a cured cement, where the cement dispersant increases the rheological properties of the cement composition.

A twenty-first aspect of the present disclosure is directed to a method for cementing a wellbore. The method comprises dispensing a cement composition into an annulus defined between a tubular string and an inner wall of a wellbore or between two tubular strings, where the cement composition comprises: from 10 weight percent to 70 weight percent cement precursor based on the total weight of the cement composition; from 5 weight percent to 70 weight percent water based on the total weight of the cement composition; and from 0.001 percent by weight of cement (BWOC) to 1.0 percent BWOC cement dispersant, where the cement dispersant comprises a polynaphthalene sulfonate salt having a weight average molecular weight of from 2500 g/mol to 3000 g/mol; and allowing the cement composition to cure in the annulus to form a cured cement, where the cement dispersant increases the rheological properties of the cement composition.

A twenty-second aspect of the present disclosure may include either one of the twentieth or twenty-first aspects, further comprising drilling a portion of a wellbore and placing a tubular string in the wellbore.

A twenty-third aspect of the present disclosure may include any one of the twentieth through twenty-second aspects, further comprising preparing the cement composition by combining the cement precursor and water to prepare a cement slurry; combining the cement retarder with the cement slurry to produce the cement composition; and mixing the cement composition to obtain a homogeneous mixture.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of" For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A cement composition comprising:
   from 10 weight percent to 70 weight percent cement precursor based on the total weight of the cement composition;
   from 5 weight percent to 70 weight percent water based on the total weight of the cement composition; and
   from 0.001 percent by weight of cement (BWOC) to 1.0 percent BWOC cement dispersant, where the cement dispersant comprises a polynaphthalene sulfonate salt having a weight average molecular weight of from 2500 g/mol to 3000 g/mol and wherein the cement dispersant comprises from 92 weight percent to 95 weight percent polynaphthalene sulfonate based on the total weight of the cement dispersant.

2. The cement composition of claim 1, where the polynaphthalene sulfonate salt has a weight average molecular weight of from 2700 g/mol to 2800 g/mol.

3. The cement composition of claim 1, wherein the polynaphthalene sulfonate salt has a weight average molecular weight of 2774 g/mol.

4. The cement composition of claim 1, wherein the polynaphthalene sulfonate salt comprises one or more cations selected from the group consisting of sodium, lithium, potassium, ammonium, and combinations of these.

5. The cement composition of claim 4, wherein the polynaphthalene sulfonate salt is sodium polynaphthalene sulfonate.

6. The cement composition of claim 1, wherein the cement dispersant further comprises formaldehyde, acetone, or both.

7. The cement dispersant of claim 6, wherein the cement dispersant comprises from 5 weight percent (wt. %) to 8 wt. % water based on the total weight of the cement dispersant.

8. The cement composition of claim 1, where the cement precursor is an American Petroleum Institute (API) Class G cement.

9. The cement composition of claim 1, further comprising a weighting agent selected from sand, barite (barium sulfate), hematite, calcium carbonate, siderite, ilmenite, silica sand, manganese oxide (MnO), hausmanite (manganese tetroxide ($Mn_3O_4$)), zinc oxide, zirconium oxide, iron oxide, fly ash, or any combination thereof.

10. The cement composition of claim 1, further comprising at least one additive selected from the group consisting of an expansion additive, a silica sand, a cement retarder, a defoamer, a gelling agent, and combinations of these.

11. The cement composition of claim 1, further comprising:
    from greater than 0 percent BWOC to less than or equal to 10 percent BWOC of an expansion additive;
    from greater than 0 percent BWOC to less than or equal to 20 percent BWOC silica sand;
    from greater than 0 percent BWOC to less than or equal to 5 percent BWOC defoamer; and
    from greater than 0 percent BWOC to less than or equal to 10 percent BWOC gelling agent.

12. The cement composition of claim 1, further comprising about 16% BWOC silica sand, about 0.005% BWOC expansion additive, about 16% BWOC weighting additive; 0.0001% BWOC defoamer; 0.003% BWOC cement retarder and about 20% BWOC water.

13. The cement composition of claim 1, where the cement composition has a plastic viscosity (PV) of from 1 centepoise (cP) to 200 cP at room temperature prior to curing of the cement composition.

14. The cement composition of claim 1, where the cement composition has a 10 second gel strength greater than or equal to 4 pounds of force per 100 square feet ($lb_f/100$ $ft^2$), as determined according to the method in the API Recommended Practice for Cementing.

15. The cement composition of claim 1, where the cement composition has a yield point (YP) of from 5.5 pounds of force per 100 square feet ($lb_f/100$ $ft^2$) to 17.5 $lb_f/100$ $ft^2$ at room temperature within 20 minutes of preparing the cement composition.

16. The cement composition of claim 1, wherein the cement dispersant consists of polynaphthalene sulfonate salt, water, acetone and formaldehyde.

17. A method for cementing a wellbore, the method comprising:
    dispensing a cement composition into an annulus defined between a tubular string and an inner wall of a wellbore or between two tubular strings, where the cement composition comprises:
    from 10 weight percent to 70 weight percent cement precursor based on the total weight of the cement composition;
    from 5 weight percent to 70 weight percent water based on the total weight of the cement composition; and
    from 0.001 percent by weight of cement (BWOC) to 1.0 percent BWOC cement dispersant, where the cement dispersant comprises a polynaphthalene sulfonate salt having a weight average molecular weight of from 2500 g/mol to 3000 g/mol and wherein the cement dispersant comprises from 92 weight percent to 95 weight percent polynaphthalene sulfonate based on the total weight of the cement dispersant; and
    allowing the cement composition to cure in the annulus to form a cured cement, where the cement dispersant increases the rheological properties.

18. The method of claim 17, further comprising drilling a portion of a wellbore and placing a tubular string in the wellbore.

19. The method of claim 17, further comprising preparing the cement composition by:
    combining the cement precursor and water to prepare a cement slurry;
    combining the cement retarder with the cement slurry to produce the cement composition; and
    mixing the cement composition to obtain a homogeneous mixture.

* * * * *